US006643798B2

(12) United States Patent
Barton et al.

(10) Patent No.: US 6,643,798 B2
(45) Date of Patent: *Nov. 4, 2003

(54) SELF-TEST ELECTRONIC ASSEMBLY AND TEST SYSTEM

(75) Inventors: James M. Barton, Los Gatos, CA (US); Shahin Tahmassebi, Pleasanton, CA (US); David Platt, Mountain View, CA (US)

(73) Assignee: TiVo, Inc., Alviso, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/097,761

(22) Filed: Mar. 14, 2002

(65) Prior Publication Data

US 2002/0091966 A1 Jul. 11, 2002

Related U.S. Application Data

(63) Continuation of application No. 09/357,183, filed on Jul. 19, 1999.

(51) Int. Cl.$^7$ ............................ G06F 11/00; G01R 31/28
(52) U.S. Cl. ............................ 714/25; 713/202
(58) Field of Search ............................ 714/25, 30, 32, 714/38, 39, 48; 713/200, 201, 202; 380/4, 21, 30

(56) References Cited

U.S. PATENT DOCUMENTS

| | | | | |
|---|---|---|---|---|
| 5,499,294 A | * | 3/1996 | Friedman | 380/10 |
| 5,557,743 A | * | 9/1996 | Pombo et al. | 395/186 |
| 6,154,543 A | * | 11/2000 | Baltzley | 380/255 |
| 6,292,895 B1 | * | 9/2001 | Baltzley | 713/168 |
| 6,343,361 B1 | * | 1/2002 | Nendell et al. | 713/171 |
| 6,385,739 B1 | * | 5/2002 | Barton et al. | 714/25 |

* cited by examiner

Primary Examiner—Nadeem Iqbal
(74) Attorney, Agent, or Firm—Glenn Patent Group; Michael A. Glenn; Kirk D. Wong

(57) ABSTRACT

A self-test electronic assembly performs self-testing, such as diagnostic or run-in testing of components and circuits, based upon internally stored test procedures. The results of self-testing are stored internally to the device, providing valuable information regarding the self-test electronic assembly, both during the manufacturing process, and preferably for ongoing in-situ operation. A test system is preferably linked to one or more self-test electronic assemblies, and provides loopback circuitry for each installed self-test electronic assembly, whereby the self-test electronic assemblies can further test components, circuitry, and security encoding and decoding operation. The preferred test rack also provides efficient and consistent monitoring and quality control over the self-testing of self-test electronic assemblies. During in-situ operation, the self-test electronic assemblies preferably monitor operating parameters, and continue to periodically perform self-testing, while storing the information within the device, and preferably transmitting the information to an external location.

24 Claims, 13 Drawing Sheets

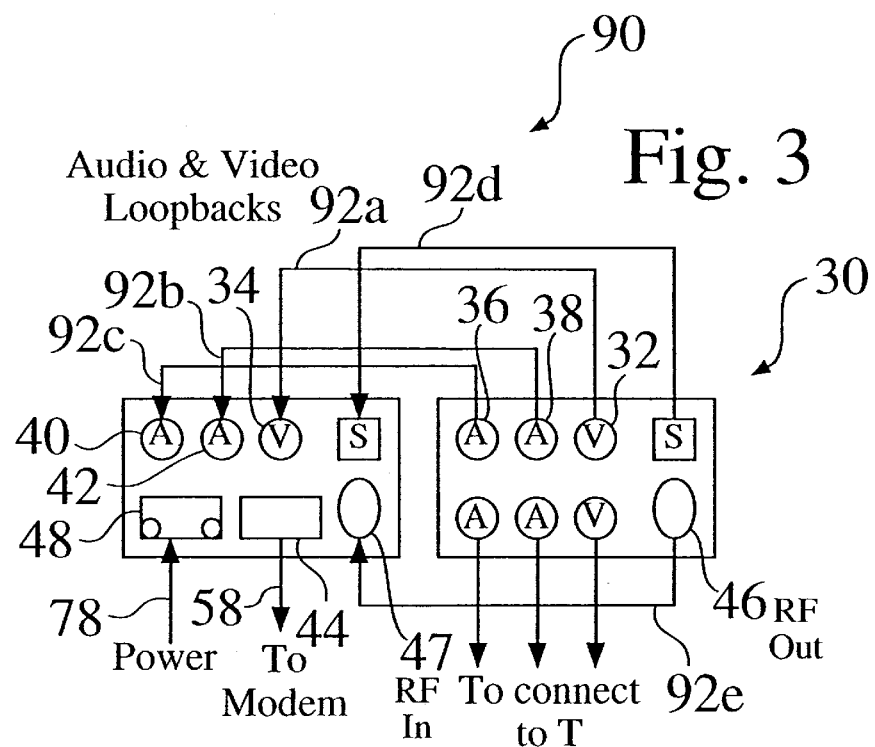
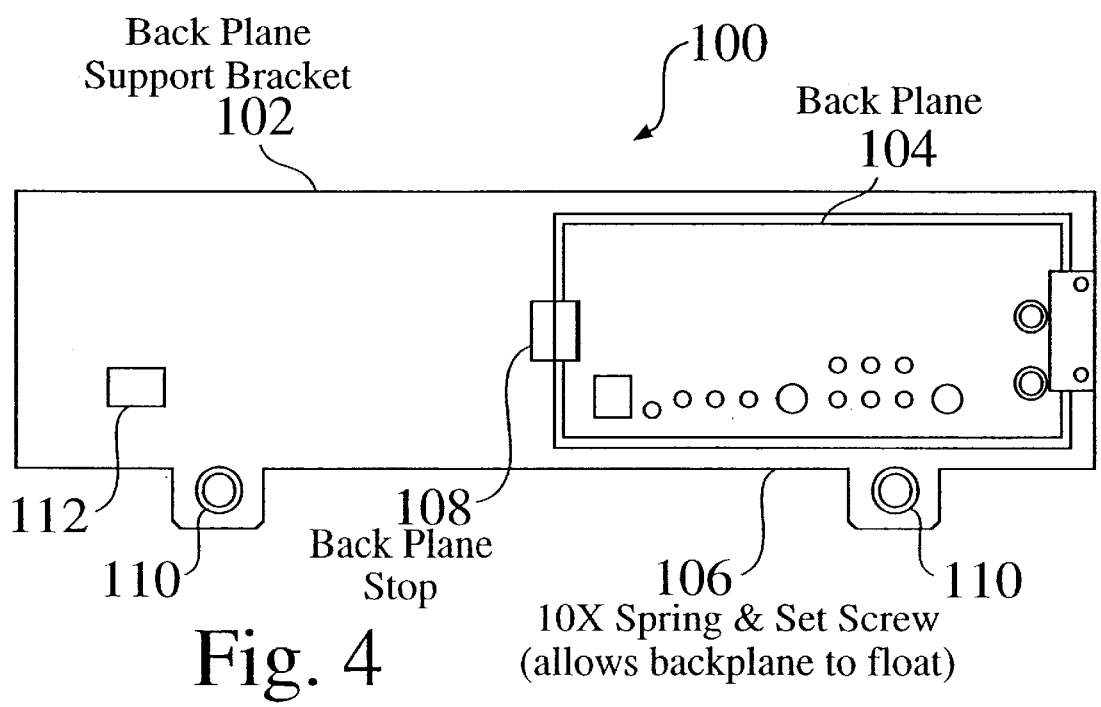

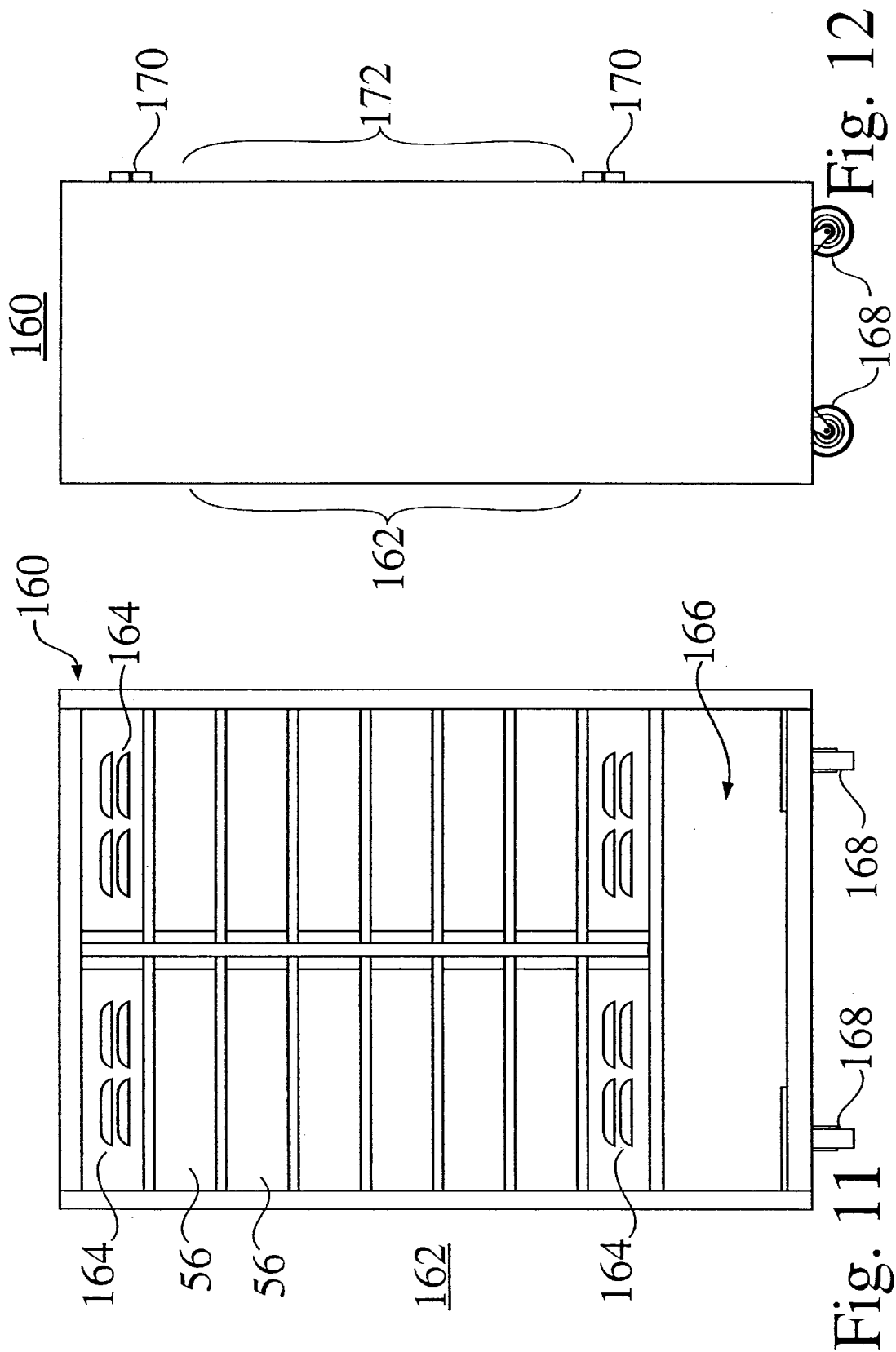

SELF-TEST ELECTRONIC ASSEMBLY AND TEST SYSTEM

CROSS-REFERENCE TO RELATED APPLICATIONS

This application is a continuation of U.S. Ser. No. 09/357,183 filed Jul. 19, 1999.

FIELD OF THE INVENTION

The invention relates to the field of electronic assemblies. More particularly, the invention relates to a method and device, or network of devices, for self-testing of electronic assemblies for quality control in manufacturing, as well as for ongoing in-situ testing and reporting.

BACKGROUND OF THE INVENTION

The manufacture of electronic assemblies is expanding yearly, providing a large variety of industrial and consumer goods. A critical factor for many manufacturing processes is the testing of manufactured goods. In order to improve the performance and quality of manufactured goods, manufacturing engineers often specify testing procedures, which are passed on to test engineers at a manufacturing facility to implement adequate tests to ensure to quality of manufactured goods. Test equipment for sensitive analog and digital circuits typically includes complex external control and monitoring hardware. For many manufacturing facilities, the testing process proves to be difficult, and is often inconsistent.

In prior art manufacturing systems, typically where testing is done by a technician, an assembly unit failing one or more tests may quickly be diverted to a reject area. Comprehensive information regarding the functional status of all components and circuitry is commonly missed. While the technician may manually tag one faulty component within an assembly, the identification of other faulty systems may be missed, or may not be properly identified. Even if a single faulty component or circuit of a rejected assembly is fixed, the unit may still have numerous circuits that have not been adequately tested. In a manufacturing facility wherein testing is manually provided by technicians, or controlled externally to the device by technicians, a basic tagging and diversion of faulty assemblies as soon as a defect is detected may be sufficient, since the cost of manual labor by technicians can be high.

B. Kennedy, Distributed Multi-Processor Boot System for Booting Each Processor in Sequence Including Watchdog Timer for Resetting Each CPU if It Fails to Reboot, U.S. Pat. No. 5,450,576 (Sep. 12, 1995) discloses a system for coordinating "initialization and self-test operations in a multiprocessor system", which "facilitates the use of central processing units based around different microprocessor types". Kennedy discloses storing "configuration information, initialization self-test code, and boot code specific to each processor, memory module, or I/O circuit board in non-executable form in a non-volatile memory, and storing the executable portion of the code needed by the initial boot processor in a centrally accessible non-volatile memory". While Kennedy discloses a system for coordinating basic initialization and self-test operations in a multi-processor system, the system does not gather and store readable information regarding individual components, nor does it retrievably store the results of self-testing internally. As well, Kennedy fails to disclose self-testing of output and input signals through loopback circuitry, nor does he disclose a security architecture for access to stored information.

B. Kennedy, Booting of Multi-Processor System from a Boot ROM of Narrower Width than the System Memory, U.S. Pat. No. 5,659,748 (Aug. 19, 1997) discloses a system for coordinating "initialization and self-test operations in a multiprocessor system", which "facilitates the use of central processing units based around different microprocessor types". Kennedy discloses storing "configuration information, initialization self-test code, and boot code specific to each processor, memory module, or I/O circuit board in non-executable form in a non-volatile memory, and storing the executable portion of the code needed by the initial boot processor in a centrally accessible non-volatile memory". While Kennedy discloses a system for coordinating basic initialization and self-test operations in a multi-processor system, the system does not gather and store readable information regarding individual components, nor does it retrievably store the results of self-testing internally. As well, Kennedy fails to disclose self-testing of output and input signals through loopback circuitry, nor does he disclose a security architecture for access to stored information.

J. Brown and D. Bhavsar, Architecture for System-Wide Standardized Intra-Module and Inter-Module Fault Testing, U.S. Pat. No. 5,627,842 (May 6, 1997) disclose an "Apparatus and method for hierarchical, centralized boundary-scan fault-testing of extended electronic circuits, including inter-board testing, within a unified, standard protocol. During this testing, each board is "viewable" from the central test control in the same way that it is viewable when standing alone, before being incorporated into an extended system". While Brown et al. disclose standardized hierarchal system testing, they fail to disclose internal gathering and storage of readable information regarding individual components, nor do they disclose the retrievable storage of self-test results internally to the assembly. As well, Brown et al. fail to disclose self-testing of output and input signals through loopback circuitry, nor do they disclose a security architecture for limited access to stored information.

F. Warren, H. Crisler, R. Jacobson, C. Kim, and E. Llewellyn, In-Circuit Testing System, U.S. Pat. No. 4,791,356, Dec. 13, 1988, disclose "An in-circuit test system having means to stimulate the device-under-test at any desired electrical node of the device, means to record the device's response waveform at any node, means to edit the response waveform, and means to use the edited waveform to restimulate the same device in a subsequent in-circuit test."

M. Rutenberg, Method and System for Improving the Operational Reliability of Electronic Systems Formed of Subsystems Which Perform Different Functions, U.S. Pat. No. 4,740,887 (Apr. 26, 1988) discloses a method and system "for improving the reliability of an electronic system formed of subsystems which perform different functions", whereby an "electronic system is analyzed to determine which of the subsystems is most likely to cause a system failure and these subsystems are targeted for monitoring and/or correction" by an microcontroller unit which is not part of the electronic system. The external microcontroller unit "monitors the inputs and outputs of the targeted subsystems and determines when an output is inappropriate for the corresponding input. When an error is detected, an error code is stored in memory for future reference. When the microcontroller is in a correcting mode, open collector drivers are used to make corrections for an error in a digital output". While Rutenberg discloses the testing of an electronic system, and the storage of detected errors, Rutenberg fails to disclose the self-testing and test result storage within the electronic system itself. As well, Rutenberg fails to disclose the self-testing of output and input signals through loopback circuitry, or a security architecture for limited access to stored information.

V. Kadakia, C. Holt, and R. Moore, Digital Circuit Module Test System, U.S. Pat. No. 4,000,460 (Dec. 28, 1976), disclose an apparatus for "automatic production testing of large digital circuit modules", whereby a "test station, under computer control, applies test bit patterns and clock pulses to the module under test, analyzes the resultant outputs, and isolates any fault found to one or several IC's. The test station contains power supplies and air cooling for the module, and a keyboard display and printer for use by the test operator. Test programs are developed off-line and are loaded from magnetic tape into a disk pack where they are available to the computer". While Kadakia et al. disclose an apparatus for the production testing of large digital circuit modules, testing is controlled externally to each circuit module, and does not gather and store readable information regarding individual components. As well, tested circuit modules do not retrievably store the results of self-testing internally. In addition, Kadakia et al. fail to disclose self-testing of output and input signals through loopback circuitry, nor do they disclose a security architecture for access to stored information.

It would also be advantageous to provide a secure communication channel for the transfer of information between an electronic assembly and an external source after preliminary testing, such as during in-situ operation of the electronic assembly. A central problem of all secure communications is the secure distribution of security keys to the communicating parties. The creation of a secure communication channel requires that parties to the communication each have a copy of an appropriate security key, such as to establish communication, or to decrypt communication information.

Currently, the distribution of security keys is commonly accomplished through separate channels. For example, security keys may be sent through regular surface mail, or spoken over a telephone connection. Such distribution is undesirable, and is impractical for broad consumer-oriented electronic assemblies, such as for distributed television viewing systems.

An alternative mechanism for the distribution of security keys uses a "smart card" technology, wherein a small microcontroller is embedded, such as on a business-card sized package. The microcontroller stores the key in a secure memory, and provides a communication protocol for authenticating and decrypting messages. Such a mechanism is unsatisfactory, due to unreliability of physical connections for communication, ease of attack on the security protocol, ease of duplication, and the lack of security for internal operations, such as for access to internal storage devices.

The development of a manufacturing system wherein all testing is automatically performed internally to the assembly being tested, without technician intervention, and wherein all detected defects are captured by the assembly being tested, and are logged internally to the device, would constitute a major technological advance. The further development of such a device which can also retrievably store readable information regarding individual components, and provide on-going in-situ operation parameters and self-testing and retrievably store the test results would constitute a further technological advance. In addition, the development of a secure method for security key distribution between an electronic assembly and an external source would constitute a further technological advance.

SUMMARY OF THE INVENTION

A self-test electronic assembly performs self-testing, such as diagnostic or run-in testing of components and circuits, based upon internally stored test procedures. The results of self-testing are stored internally to the device, providing information regarding the self-test electronic assembly, both during the manufacturing process, and preferably for ongoing in-situ operation. A test system is preferably linked to one or more self-test electronic assemblies, and provides loopback circuitry for each installed self-test electronic assembly, whereby the self-test electronic assemblies can further test components, circuitry, and security encoding and decoding operation. The preferred test rack also provides efficient and consistent monitoring and quality control over the self-testing of self-test electronic assemblies. During in-situ operation, the self-test electronic assemblies preferably monitor operating parameters, and continue to periodically perform self-testing, while storing the information within the device, and preferably transmitting the information to an external location.

BRIEF DESCRIPTION OF THE DRAWINGS

FIG. 3 is a block diagram of loop back connections for the self-test system;

FIG. 4 is a front view of a spring loaded back plane and a back plane support bracket;

FIG. 11 is a front view of a multiple bay test rack enclosure;

FIG. 12 is a side view of a multiple bay test rack enclosure;

DETAILED DESCRIPTION OF PREFERRED EMBODIMENTS

Figure 1:
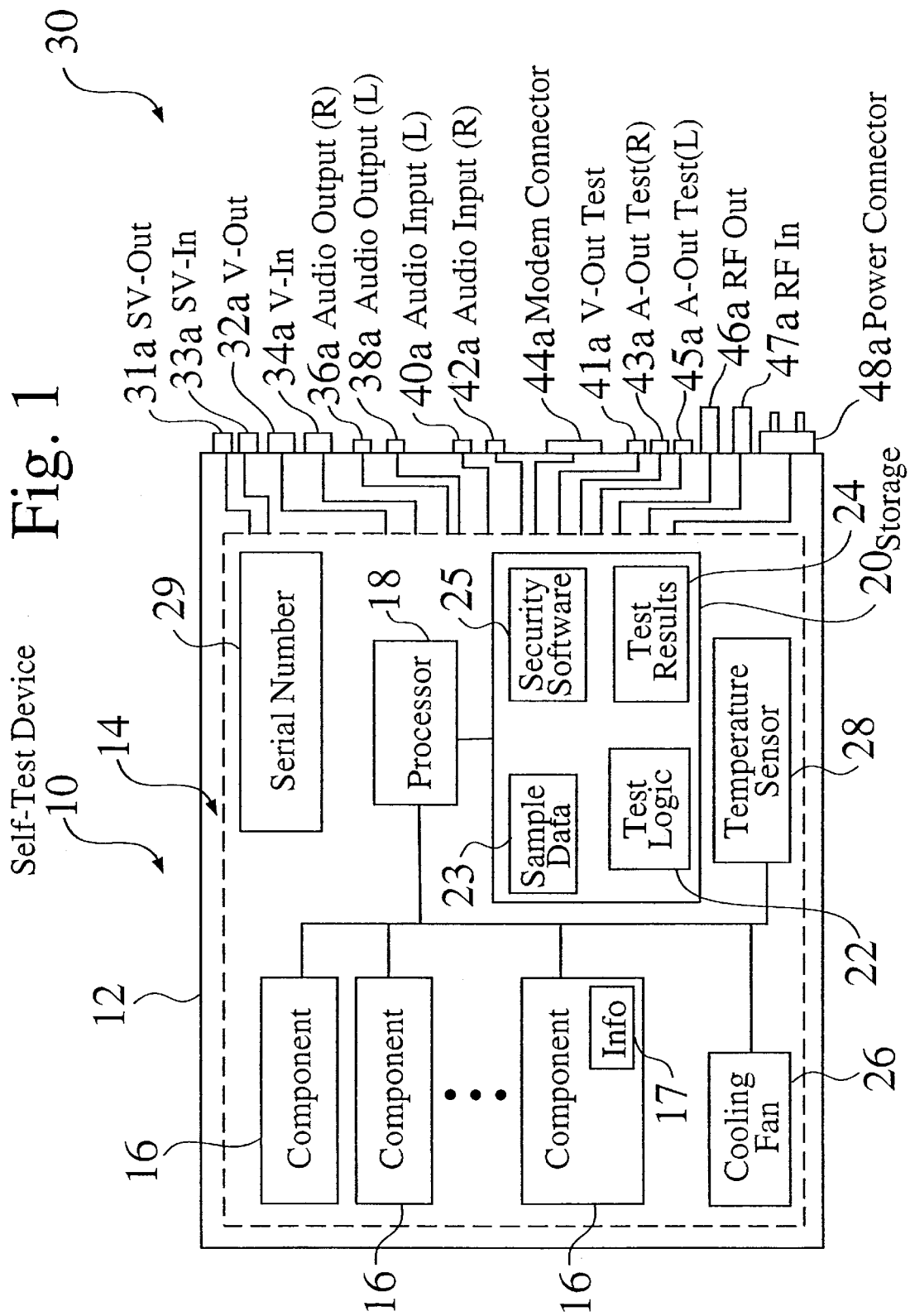
FIG. 1 is a block diagram of a self-test electronic assembly unit.

FIG. 1 is a block diagram of a self-test electronic assembly unit 10, which includes circuitry 14 comprising a plurality of interconnected components 16 within a base, chassis, or enclosure 12. One or more of the components 16 may include electronically readable information 17, such as component model number, component serial number, or component batch number. The circuitry 14 shown within FIG. 1 also includes a processor 18 and storage 20. The storage 20 comprises one or more memory devices, such as but not limited to programmable read only memory (PROM), programmable random access memory (PRAM), flash memory, one or more hard drives, or removable media.

Figure 17:
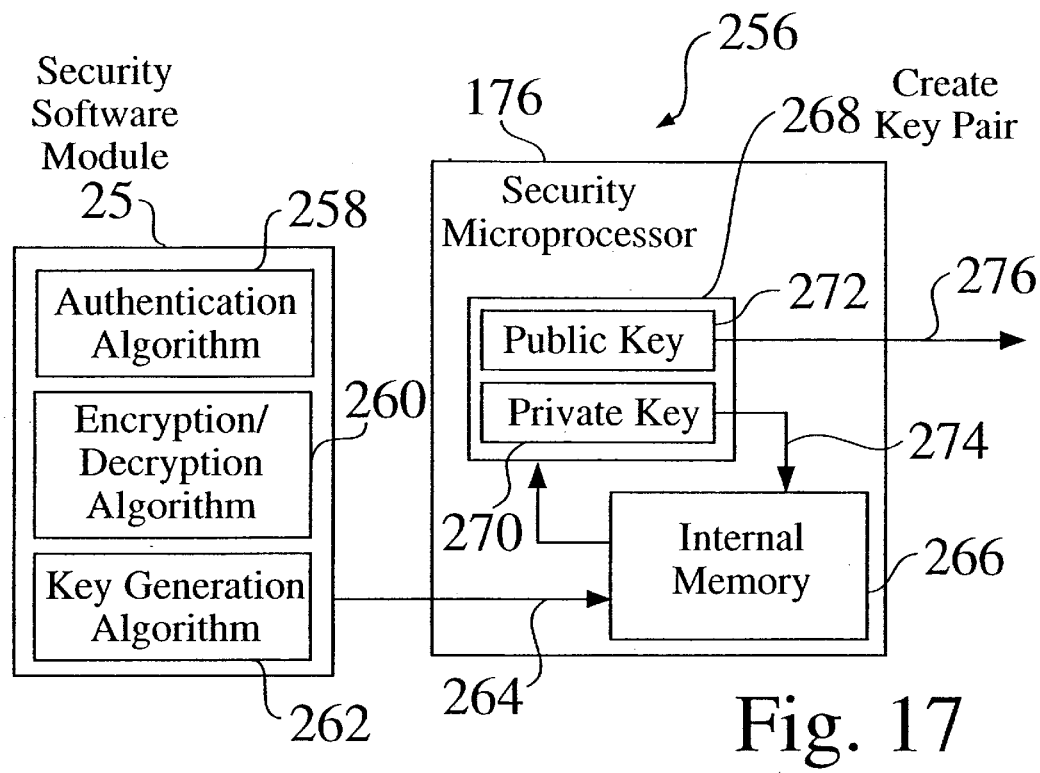
FIG. 17 is a detailed block diagram of preferred generation, storage and transfer of security keys during the manufacturing process.

The storage media 20 includes test logic 22 and sample data 23, which are used by the self-test electronic assembly 10 to conduct various self-testing, such as functional diagnostic testing and/or extended burn-in testing. When the self-testing is performed, the self-test electronic assembly 10 stores the retrievable test results 24 internally, such as within memory 20. A critical and time-consuming element of most conventional manufacturing processes is the testing of manufactured goods. The self-test electronic assembly 10 provides efficient and consistent self-testing, and stores results internally, thereby increasing manufacturing speed, and improving the quality of each of the manufactured self-test assemblies 10. The self-test electronic assembly 10 also typically includes a retrievable serial number 29, and in preferred embodiments, includes security software, by which the self-test electronic assembly 10 may establish security keys 270, 272 (FIG. 17).

In a preferred embodiment, the self-test electronic assembly 10 includes a temperature sensor 28 and a cooling fan 26. The temperature sensor 28 logs ambient or internal operating temperatures for the self-test electronic assembly 10, such as during initial testing, as well as during ongoing operation for the assembly 10. In some embodiments, the processor 18 controllably powers the cooling fan 26 in response to elevated ambient or internal operating temperatures measured by the temperature sensor 28.

The self-test electronic assembly 10 has a connection interface 30, which includes various input and output signal connectors and a power connector 48a. The preferred embodiment shown in FIG. 1 has a connection interface 30 that includes video output 32a, video input 34a, right channel audio output 36a, left channel audio output 38a, left channel audio input 40a, right channel audio input 42a, a modem connector 44a, an RF connector 47a, and a power connector 48a. Preferred embodiments optionally include S-video output 31a, S-video input 33a, serial port and IR blaster connections.

When the preferred embodiment of the self-test assembly 10 shown in FIG. 1 is installed by the final user (FIG. 17), the self-test assembly 10 is typically connected to an incoming television signal cable 266, a telephone line 258, and a television set 264, as well as to supplementary components, such as video cassette recorder 270, a stereo system 266, audio speakers 268a, 268b, and other devices, such as remote controllers, video game devices, or internet connection devices (e.g. such as a WebTV™ console and remote WebTV™ keyboard).

In a manufacturing environment, the functional quality of components and circuitry for a self-test electrical assembly 10 is self-tested, using internal test logic 22. Comprehensive detailed information regarding the results 24 of the self-testing is stored within the assembly 10. Components 16 or circuits 14 which do not pass one or more functional or burn-in tests are consistently 14 and accurately identified, thus allowing technicians to divert faulty assemblies 10 away from passing units 10, either to a repair area 82, or to a reject area 84 (FIG. 2).

The detailed test results 24, which are stored internally, provide valuable and consistent information 24 to guide the troubleshooting and repair of failed units 10. The detailed and logged test results 24 accompany the assembly 10, and are easily accessible, to troubleshoot an fix failed assembly units 10, without requiring a technician to manually tag and list detected problems. The overall yield of truly acceptable assembly units 10 is therefore increased, since the rigorous and uniform self-testing ensures high quality of passing assembly units 10, and fixable assembly units 10 are identifiable and efficiently remedied.

Figure 2:
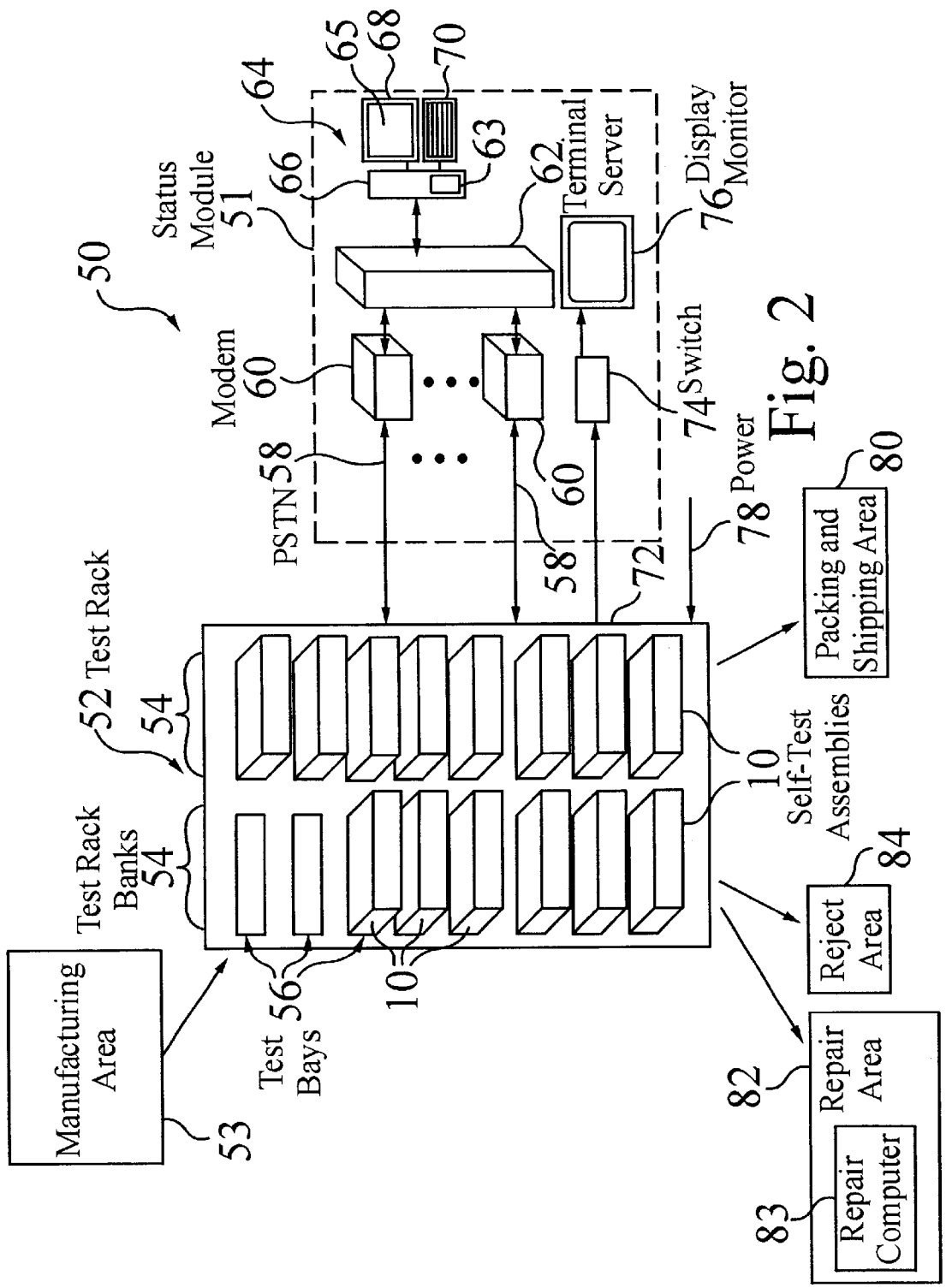
FIG. 2 is a block diagram of a multiple bay test rack, housing one or more self-test electronic assembly units, connected to a command unit and one or more display monitors.

FIG. 2 is a block diagram of a test system 50 for self-test assemblies 10. The self-test system 50 is typically used in conjunction with the manufacture of self-test assemblies 10, in which the condition of components 16, circuits 14, and self-test assemblies 10 are to be tested for quality and performance, such as before distribution and eventual shipment to a customer. A multiple bay test rack 52 typically includes one or more test banks 54, which contains a plurality of test bays 56. The multiple bay test rack 52 allows self-testing of large numbers of self-test electronic assemblies 10 at a time, from one or more manufacturing facilities 53. When large numbers of self-test assemblies 10 are manufactured at a plurality of external locations, such as by contract manufacturing, the internal test procedures 22 stored within each assembly 10, combined with the use of one or more multiple bay test racks 52, allow efficient and similar diagnostic and run-in tests to be performed at one or more test system areas 50.

Each test bay 56 provides a separable backplane connection 104 (FIG. 4) to an installed self-test electronic assembly unit 10. Each test bay 56 is also connected to the status module 51, through a simulated PSTN phone line connection 58 and a modem 60, to a terminal server 62.

Through the terminal server 62, test results on all units and yield information is monitored. This data can also be monitored from a remote location. For example, while a corporate office is located in a first location (e.g. California), a related manufacturing facility may commonly be located at a remote domestic of international location (e.g. Mexico, Europe). A user at a remote location may therefore monitor test results, yield data and failure information, in real time and dynamically.

The terminal server 62 is connected to a computer station 64, which includes a computer 66 having internal storage 63, a connected monitor 68, and one or more input devices 70, such as a keyboard and mouse. The computer 64 self-test system software which typically includes a graphic user interface 65, allowing a test operator to quickly review the operation of the test system 50.

The capacity of the test system 50 is selectively increased by adding more test banks 54 of test bays 56 to the test rack 52. Multiple test racks 52 can also be daisy-chained together, so that a larger number of self-test assemblies 10 can be tested and monitored from a single command module 64. In one test system embodiment 50, each terminal server 62 allows the routing of test information from eight test bays 56 and eight self-test assembly units 10, with eight dedicated modems 60 and phone line connections 58 to the terminal server 62. In another system embodiment 50, each terminal server 62 allows the connection and testing of sixteen self-test assembly units 10, whereby all sixteen self-test assembly units 10 are individually connected to the terminal server 62 and computer 64.

The self-test electronic assemblies 10 typically arrive at the testing area 50 from an assembly area 53, typically without bezel and cover installed on the enclosure 12. Each self-test electronic assembly 10 is then placed into a test bay 56 within the test rack 52.

FIG. 3 is a block diagram 90 of loop back connections 92 for each test bay 56 of a test rack 52 within a self-test system 50. Each test bay 56 within the test rack 52 preferably includes a back plane 104 (FIG. 4), which includes loop back circuits 92a–92n for modem, power, video, audio, serial port, and IR blaster interfaces. The test operator or technician is therefore not required to manually connect cables to a self-test electronic assembly 10.

Figure 8:
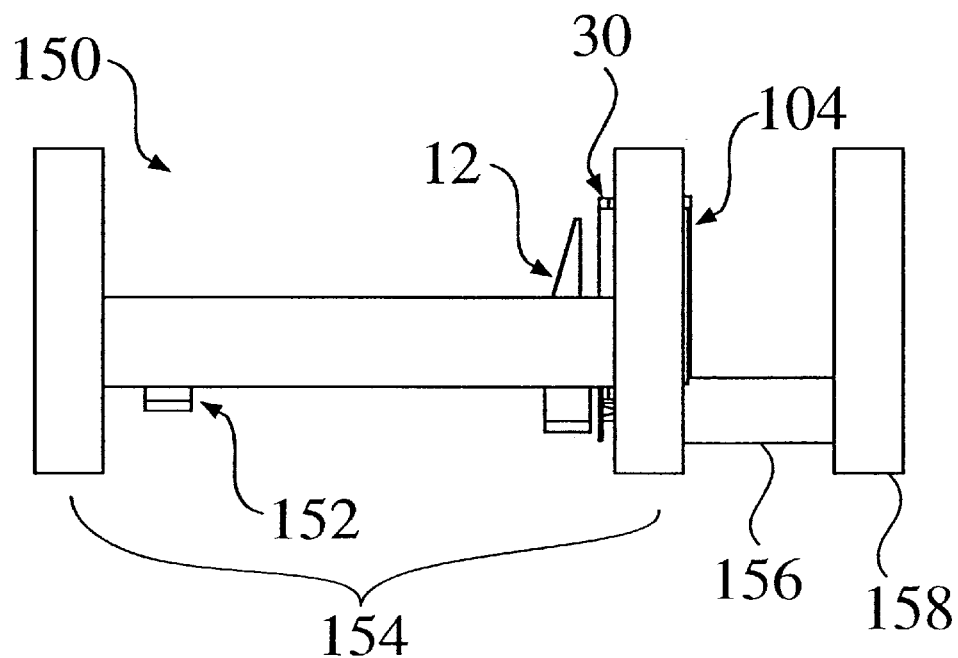
FIG. 8 is a right side view of a test bay mechanism.
Figure 9:
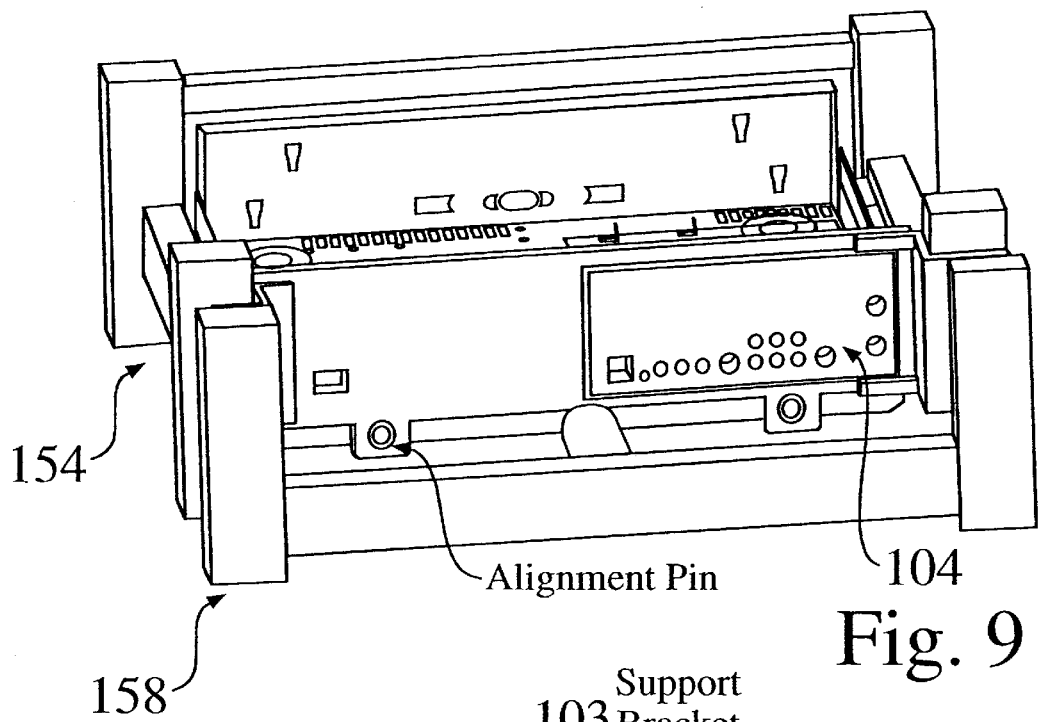
FIG. 9 is a front perspective view of a test bay mechanism.

The service operator is only required to place a built self-test assembly 10 into a vacant tray 154 (FIGS. 8, 9) in a test bay 56, and slide the tray 154 into the test bay 56. When a self-test assembly 10 is installed within a test bay 56, the connection interface 30 is connected to the backplane 104. The connectors 31a, 32a, 33a, 34a, 36a, 38a, 40a, 42a, 44a, 46a, 47a, 48a on the connection interface 30 are mate with the matching rear connectors on the backplane 104, and the tray 154 and installed self-test electronic assembly 10 moves automatically back into the test rack chassis 150 (FIGS. 8, 9).

Figure 5:
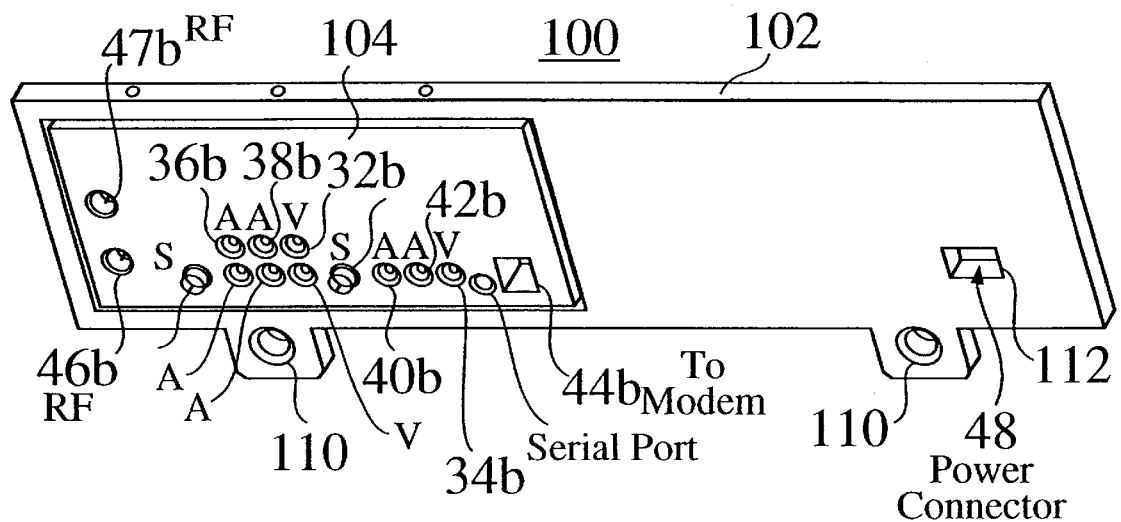
FIG. 5 is a front oblique view of a back plane and backplane to assembly connectors.

Back Plane. FIG. 4 is a front view 100 of a back plane 104 attached to a back plane support bracket 102 by spring-loaded attachment 106. Movement of the back plane 104 is limited by one or more back plane stops 108. One or more alignment holes 110 are defined in the back plane support bracket 102, and allow the back plane support bracket to slide in relation to a test bay assembly 150 (FIGS. 7–10). FIG. 5 is a front oblique view of a back plane 104 and backplane support bracket 102. The back plane includes connectors video output 32b, video input 34b, right channel audio output 36b, left channel audio output 38b, left channel audio input 40b, right channel audio input 42b, a modem connector 44b, an RF connector 47b, and a power connector 48b, which mate to the connection interface 30 of an installed self-test assembly 10.

Figure 6:
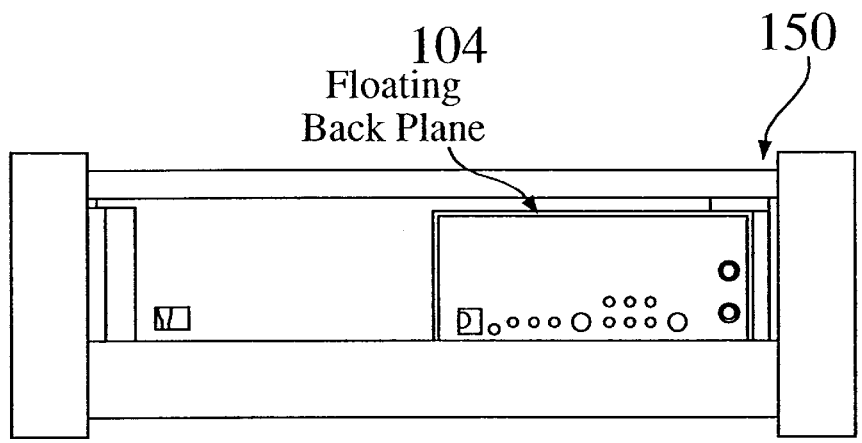
FIG. 6 is a back view of a test bay mechanism.
Figure 7:
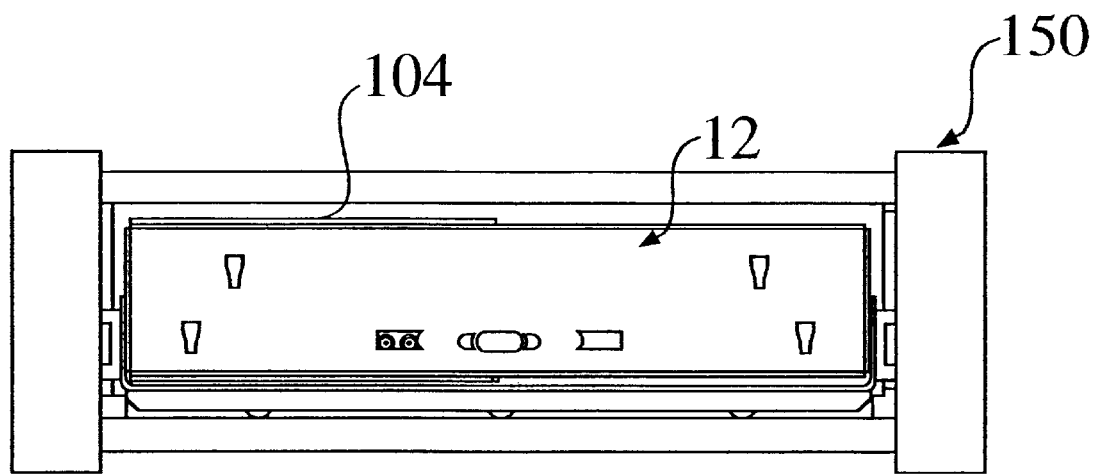
FIG. 7 is a front view of a test bay mechanism.
Figure 10:
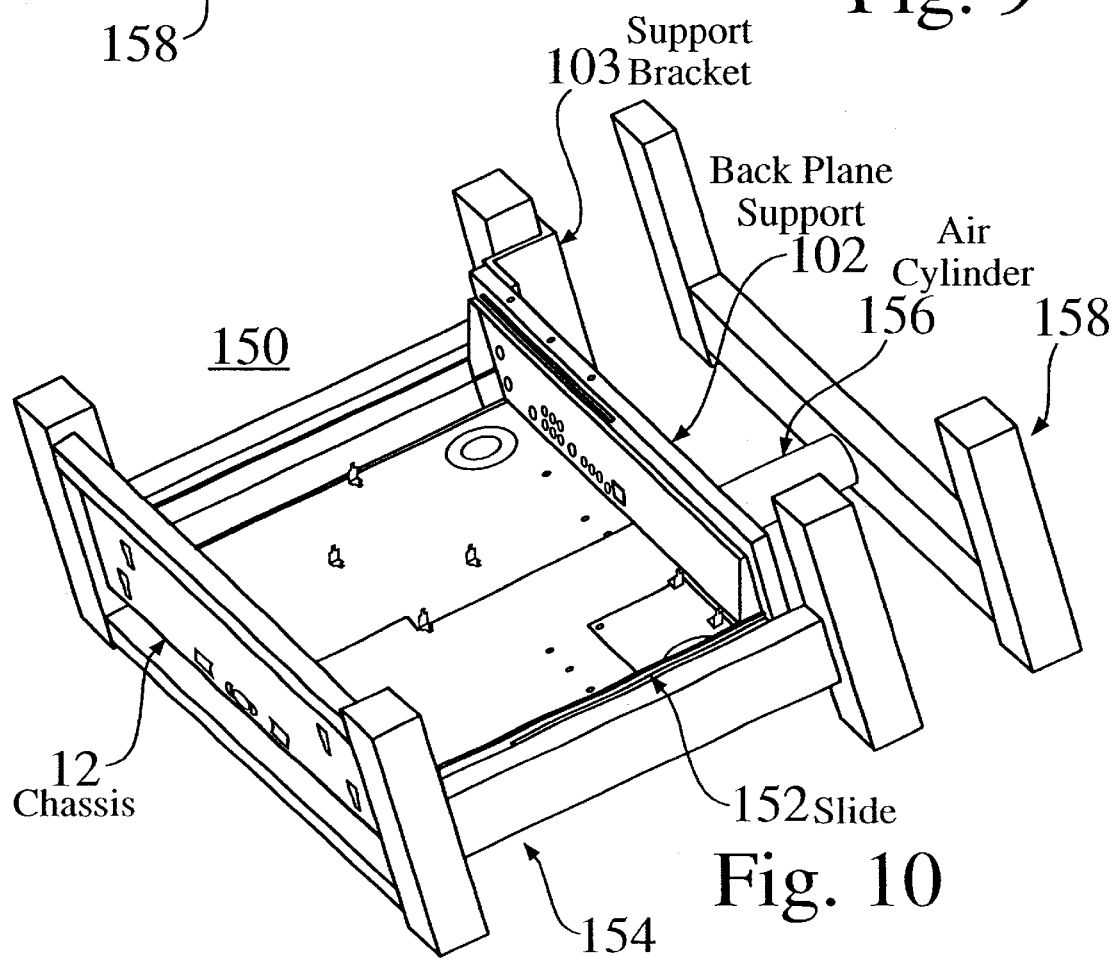
FIG. 10 is a rear top perspective view of a test bay mechanism.

Test Bay Mechanism. FIG. 6 is a back view of a test chassis mechanism 150. The back plane 104 provides a connection to the test system 50, and provides removable connections to an installed self-test assembly. FIG. 7 is a front view of a test chassis mechanism 150, with an installed assembly chassis 12. The connection interface 30 of the assembly chassis 12 connects to the various connectors 32b–48b in the spring loaded back plane 104. FIG. 8 is a right side view of a test bay mechanism 150, which includes one or more slides 152 in a mobile frame 154. An air cylinder is preferably used to move the mobile frame 154 in relation to the rear stationary frame 158. FIG. 9 is a front perspective view of a test bay mechanism 150. The alignment holes 110 in the back plane support bracket move along alignment slides 152. FIG. 10 is a rear top perspective view of a test bay mechanism.

The test bay mechanism 150 preferably includes a switch, which senses if a self-test assembly 10 is installed within the test frame 154. When an operator installs a self-test assembly 10, the switch closes, which is then sensed through a connection contact in the serial port. The serial port feeds back to the test system 51, which allows the test system 51 to detect if a whether self-test assembly 10 is installed. If the self-test assembly 10 begins proper communication and self-testing, the control system monitors the self-test sequence. Alternatively, if the self-test assembly 10 is installed, but does not respond to further communication, the control system 50, 51 can detect and display an early failure of the assembly 10. In one embodiment, such a failure may be transferred to an indicator light at the test bay 56, or is displayed on the command computer user interface 65.

Figure 13:
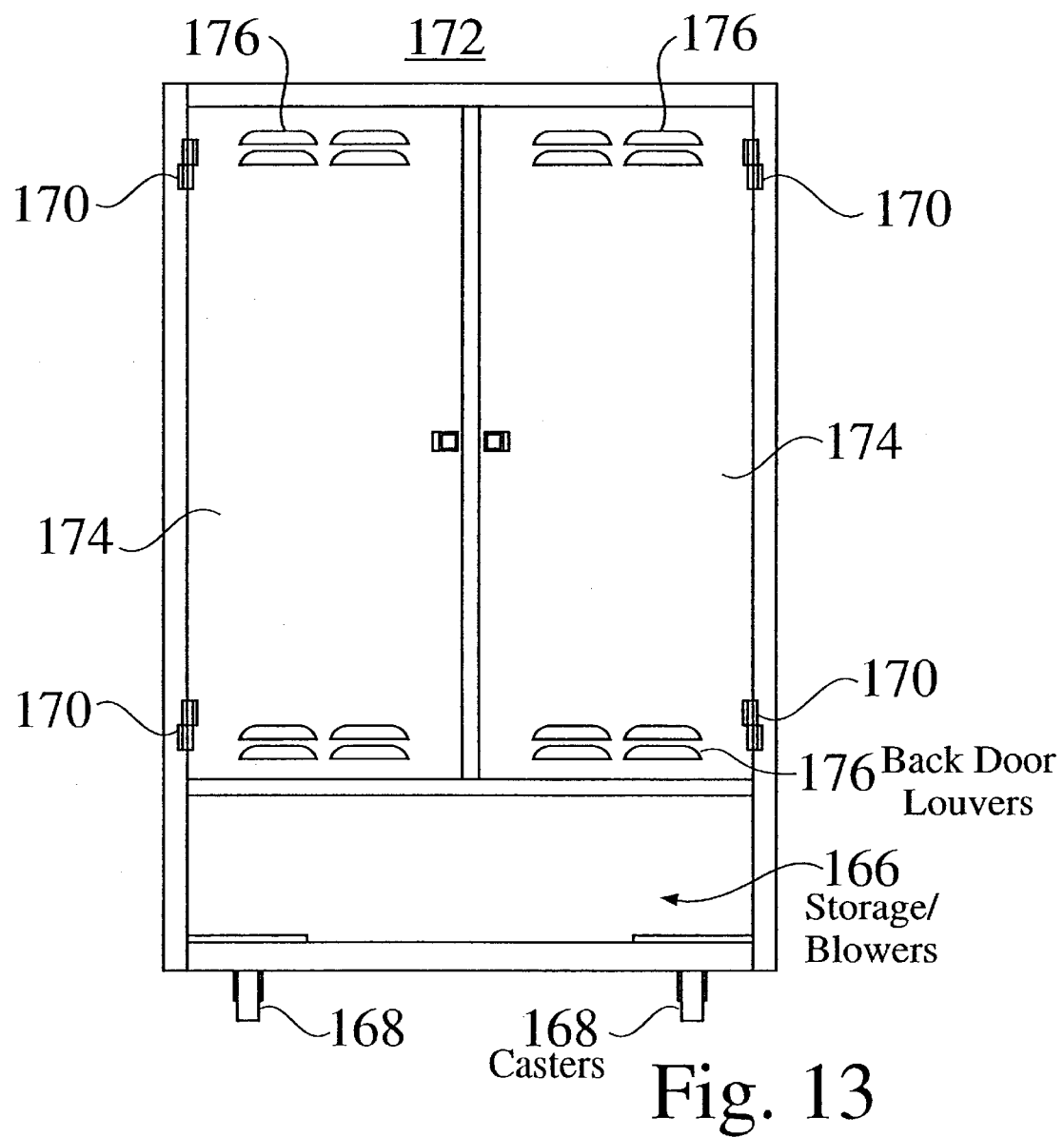
FIG. 13 is a rear view of a multiple bay test rack enclosure.
Figure 14:
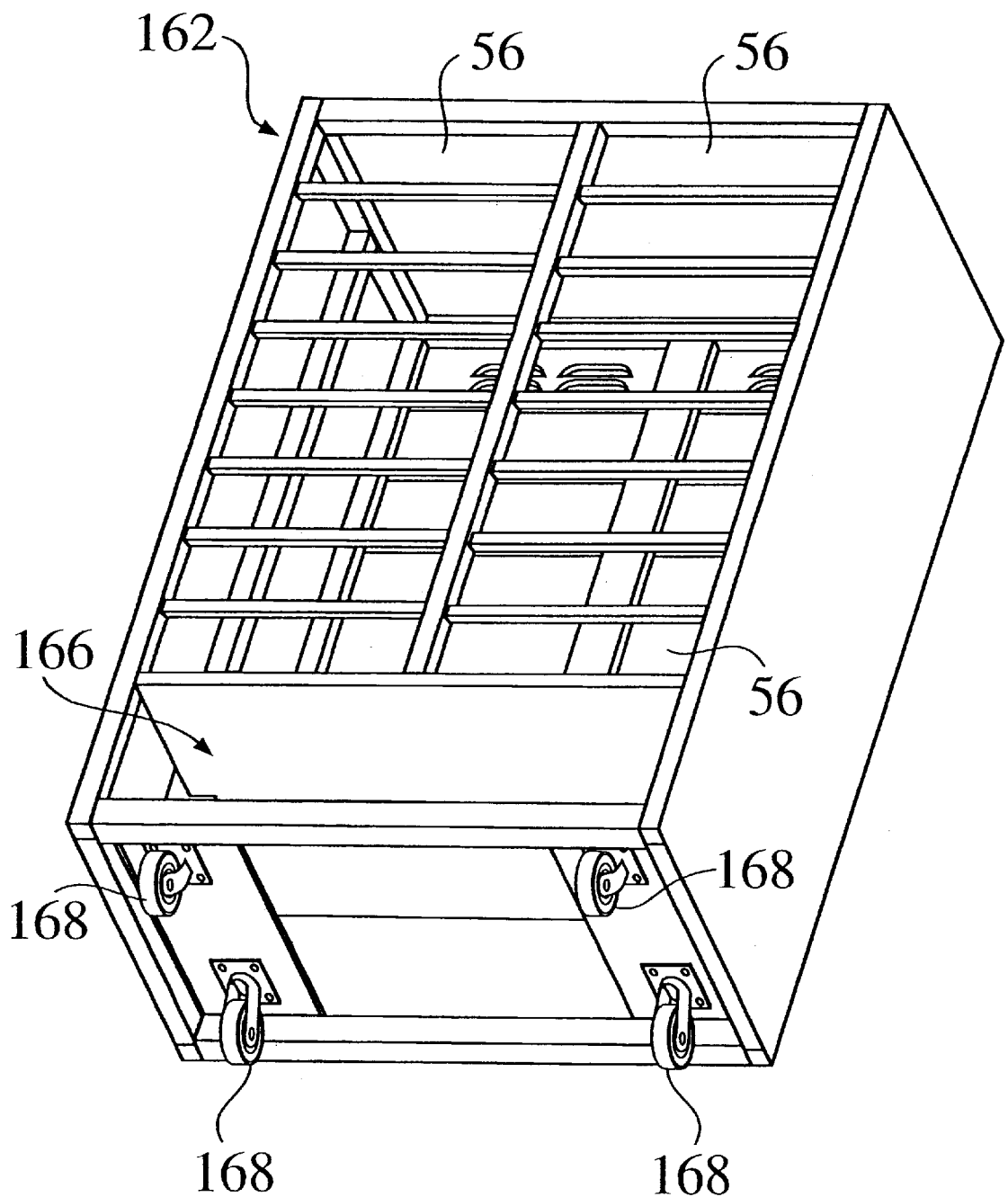
FIG. 14 is a bottom perspective view of a multiple bay test rack enclosure.

Test Rack. FIG. 11 is a front view 162 of a test cabinet 160 for a multiple bay test rack enclosure 52, having a plurality of test bays 56, louvered panels 164, a lower area for test rack parts or tools, or for supplementary equipment cooling fans. The test cabinet 160 also includes rolling and locking casters 168, whereby the test cabinet 52 may be moved, such as within the test facility 150. FIG. 12 is a side view of a multiple bay test cabinet 160 for a test rack enclosure 52, having a front side 162 which allows self-test assemblies 10 to be removably installed into test bays 56, and a back side 172, which allows rear access and rear door hinges 170, for power connections 78 and modem connections 58. FIG. 13 is a rear view 172 of a multiple bay test rack enclosure 52. Rear doors 174 having ventilation louvers 176 are hingeably mounted 170 on the rear side 172 of the test cabinet 160. FIG. 14 is a bottom perspective view of a test cabinet 160 for a multiple bay test rack enclosure 52.

Self-test assemblies 10 typically start their self-test procedures as soon as they are installed in the test rack 52, and typically are not required to wait until each test bay 56 in the test rack 52 is filled with self-test assemblies 10, to proceed with self-testing. Ongoing diagnostic or run-in testing is monitored through the command module 64 (FIG. 2).

The test procedure software 22 and test data 23 are typically loaded onto and stored within memory 20 of each self-test assembly 10 when the self-test assembly is initially installed in a test bay 56.

Each self-test assembly 10 then tests itself, based on the stored test procedures 22. Since each self-test assembly 10 tests itself, the time required to test one self-test assembly 10 is the same as the time required to test a large number of self-test assemblies 10 (e.g. 200 units). The test system 50 is therefore scalable, and the capacity can easily be increased, with the addition of test racks 52 of test bays 56, without requiring more operators for the manufacturing test area 50, and without increasing the test time for each self-test electronic assembly 10.

The video 41 and audio 43, 45 test output connections of each the self-test assemblies 10 are preferably connected to a display monitor 76, which receives and displays test result information from each self-test assembly 10. The test rack 52 is connected 72 to one or more test display monitors 76. In one embodiment, a video selector switch 74 is connected to the video output ports 72 of each test bay 56a–56n, and is switchably connected to a single display monitor 76, such that the output signals from a selected self-test assembly 10 is selectably monitored by an operator.

In an alternate preferred embodiment, the video output ports 72 of each test bay 56a–56n are each connected to a separate, dedicated display monitor 76, such that the output signals from several selected self-test assemblies 10 can be monitored concurrently by an operator. In one embodiment, separate, dedicated 13" television monitors 76 are used, each having composite (i.e. video and audio) signal connections. The placement of individual dedicated monitors 76 next to each test bay 56 allows operators to easily view the ongoing testing of self-test assemblies, and allows operators to easily distinguish passing units 10 or failed units 10. Therefore, passing self-test assemblies 10 are prevented from being placed into a reject area 84, while faulty assemblies 10 are more fully prevented from being placed into a passing area 80.

The test rack 52 can be a functional diagnostic self-test station, or can be a "burn-in" self-test station. A functional diagnostic test station typically performs all functional tests once, while a burn-in station typically performs functional tests repeatedly, such that self-test assemblies 10 are commonly run for several hours (e.g. 4, 8, or 24 hours). Each bay 56 within a test rack 52 is typically separately reconfigurable, such as for either functional testing or for "burn-in" testing. When a self-test assembly 10 is placed into a test bay 56, the command station 64 typically displays which type of testing is performed for the selected bay 56. Typically, all bays 56 in a single rack are configured similarly (e.g. either each bay 56 in a test rack is used for function testing, or alternatively, each bay 56 in a test rack 52 is used for burn-in testing).

The user interface display 65 on the command station 64 is preferably color-coded, providing a distinguishable display for the type of testing performed. While a display monitor 76 receives and displays test information and results from a single self-test assembly 10, the user interface 65 on the command station 64 can display the testing status of one or more self-test assemblies concurrently. When displaying the status for a self-test assembly, a displayed color for an installed assembly is typically used to distinguish a "passing" assembly from a "failed" assembly. For example, in one embodiment, the displayed color for a test bay on the user interface 65 is green for a "passing" unit, displayed color for a test bay on the user interface turns red for a "failed" unit. The colored indicator flashes while testing is in progress, and remains solid (either green or red) when testing is completed.

In another embodiment, each self-test assembly 10, or alternatively, the test bay 56 in which a self-test assembly 10 is installed, includes light emitting diodes (LED's) for testing purposes, in similar colors and operation to the displayed colors on the user interface 65. If a self-test assembly 10 fails, a red test LED is illuminated on the self-test assembly 10, whereas if the self-test assembly passes all tests, a green test LED is illuminated on the self-test assembly 10. While the self-test assembly is testing, the green test LED blinks. The preferred test LED's on the chassis 12 of a self-test assembly provide an efficient local determination of the status of tests, so that a test operator or technician can quickly and accurately identify and divert passing or failed self-test assemblies correctly.

Diagnostic Testing. Once a self-test electronic assembly 10 is placed within the test rack 52, it is automatically powered on. In one embodiment, the processor establishes a PPP connection, and performs an FTP get to obtain and store the required test logic 22.

Figure 15:
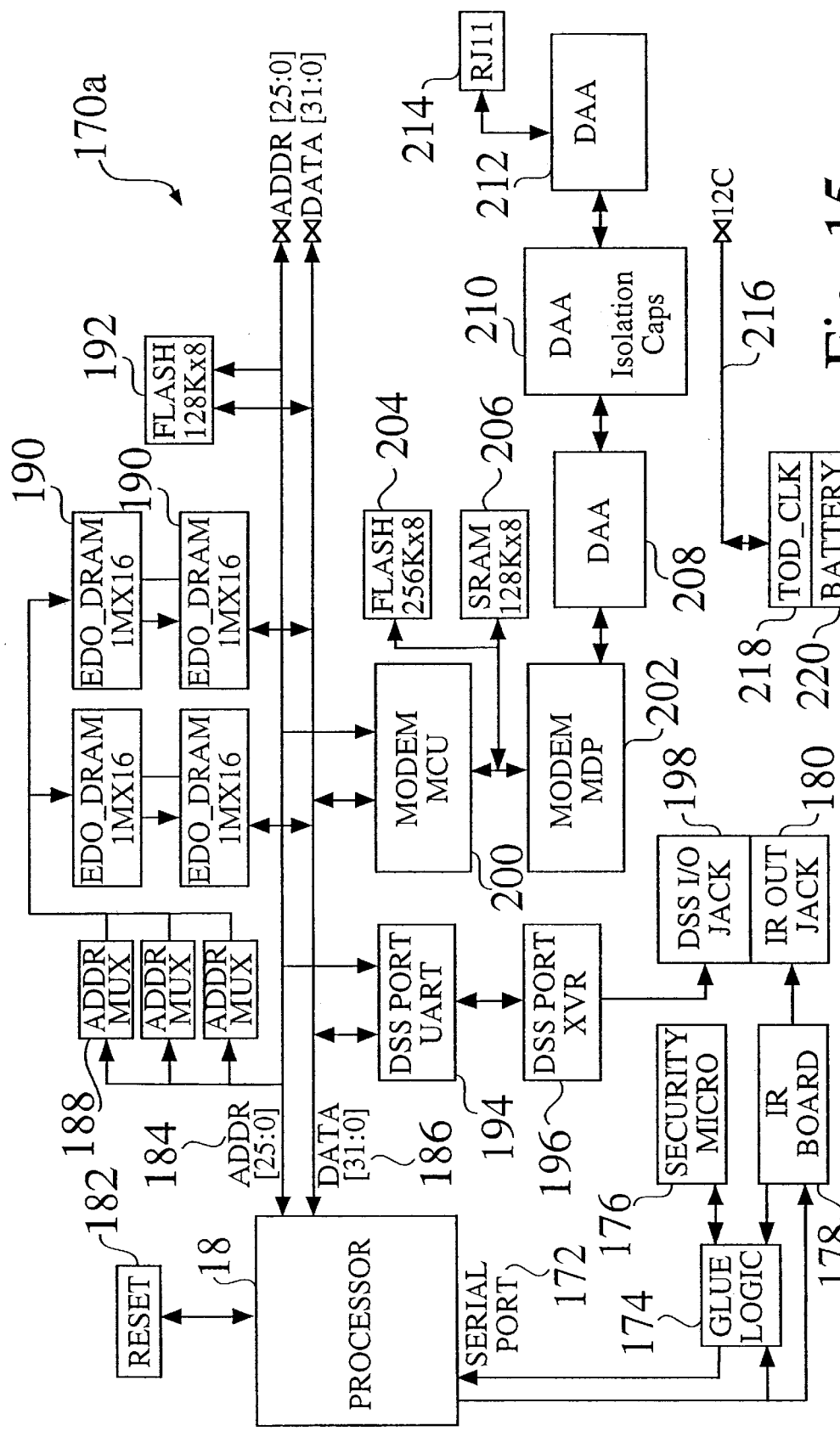
FIG. 15 is a first block diagram for an assembly which can perform self-testing.
Figure 16:
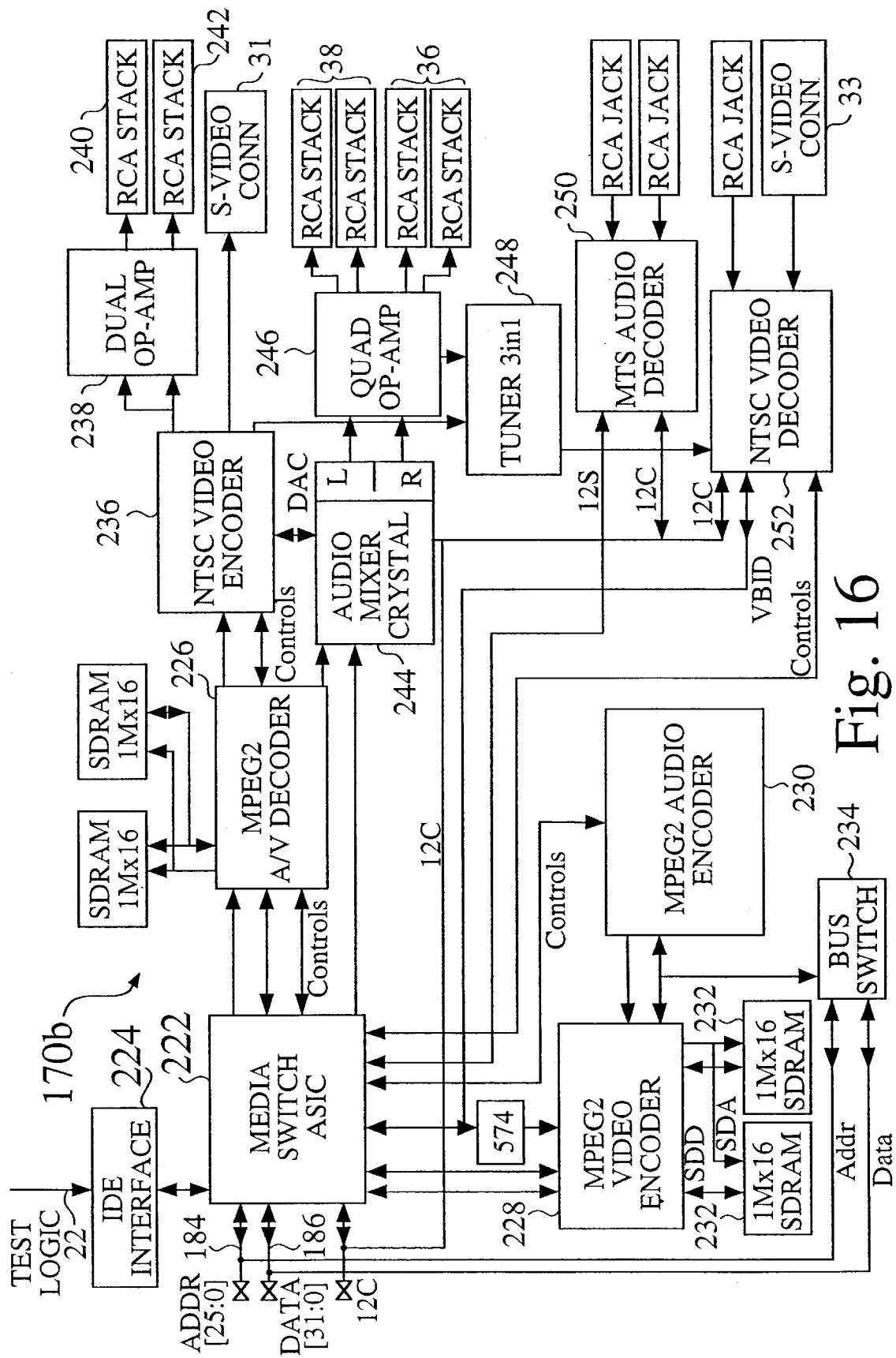
FIG. 16 is a second block diagram for the assembly which can perform self-testing shown in FIG. 15.

The processor 18 then executes a diagnostic testing script, based upon the stored test logic 22. The self-test electronic assembly 10 performs several diagnostic tests while installed within the test rack 52. As the self-test electronic assembly 10 executes the diagnostic tests, the self-test electronic assembly 10 updates the server 62 with the results, either on a continuous basis, as tests are performed, or as a final test report, when all functional tests are complete. Each test builds increasing confidence in a self-test electronic assembly 10, as it checks components 16 and circuitry 14, such as memory, system RAM disk, and signal encoders and decoders (FIGS. 15, 16).

Diagnostic testing runs in each self-test electronic assembly 10 as a stand-alone process, since the test logic and control 22 resides within the self-test electronic assembly 10, and the processor 18 performs the required tests, and creates a report card 24. Since each self-test electronic assembly 10 is responsible for it's own testing, an increase in the number of self-test electronic assembly units 10 within a test rack 52 does not increase the test time. It takes the same amount of time to test thirty-two units 10 as it does to test a single unit 10.

The self-test electronic assembly 10 is able to perform testing of several of the components 16 and circuitry 14, by sending signals 32, 36, 38, 46 through loop-back circuits 92a–92n, and processing or comparing the "received" signals 34, 40, 42, 47 (e.g. such as audio or video signals) to the original data 23, to confirm component and assembly performance. For loop-back testing, the processor 18 controllably sends one or more stored test signals 23 out from the output ports, which are then looped back to the input ports of self-test assembly unit 10. The returning signals are then processed (e.g. such as through decoding components 16). The processor 18 then compares the received and processed signal to the original stored signal 23, to confirm that the returning signal is correct (e.g. identical to the original stored test images located on the storage drive 20). In one embodiment, the self-test assembly unit 10 can also receive a standard television signal feed (e.g. having both video and audio signals), which it processes, and the performs audio and video loopback testing.

In addition to the loopback testing of video and audio signals, the self-test assembly unit 10 can perform testing of the transmission reception, processing, encoding, and decoding of other data, such as over the connected serial modem 60.

In one embodiment, the self-test assembly unit 10 provides full encoding and decoding of signals. The self-test assembly 10 tests the encoding and decoding operations, typically be taking a test signal, such as stored data 23 or received signal data, encoding the signal, sending the signal through the output ports, (e.g. 32, 36, 38), across the loopback circuits 92, and into the input ports (e.g. 34, 40, 42), where the self-test assembly decodes the encoded data, and compares the decoded data to the original signal 23, and distinguishes whether or not the self-test assembly unit 10 received the same signal 23 that was originally encoded and transmitted.

The user interface 65 running on the test server 62 displays the ongoing or final status of the tests. A self-test assembly 10 which is being tested is shown in the selected test bay 56 within the user interface 65, and is indicated by the color yellow, with a display message, indicating the "TESTING" status. If the self-test electronic assembly 10 passes all the required tests, the displayed bay for the installed self-test electronic assembly 10 turns green, and displays a "SHIP IT" message, whereby the operator can remove the desired self-test assembly 10 from the test rack 52, and place it in a packing and shipping area 80 (FIG. 2). Otherwise, the display indicator turns red, and displays a "FAILED" message, whereby the operator can remove the desired self-test assembly 10 from the test rack 52, and place it in either a repair area 82 or a reject area 84 (FIG. 2).

As discussed above, if the main processor 18 within a self-test assembly 10 is non-functional, the command module 64 quickly receives a signal which indicates that one or more key functional areas 14, 16 of the self-test assembly 10 is faulty, so that the assembly may be properly routed to either a repair area 82 or to a reject area 84.

Once a self-test assembly unit 10 finishes self-testing, the self-test assembly unit 10 stores the test results 24 as a retrievable log file. There is no requirement from an external operator to determine which part of the device failed, or a requirement to tag. The retrievable log file 24 is stored within the device 10, and therefore accompanies with the assembly 10, if it is transferred from the testing area to a repair area 82. At a repair area 82, the log file 24 can be retrieved, and is matched to the serial number 29 (FIG. 1) on the chassis 12.

Run-in Testing. Run-in is typically done on a sampled basis, either before or after functional diagnostic testing. In one embodiment, prior to functional diagnostic testing, a selected percentage of self-test assembly units 10 are tested (e.g. ten percent) for a specified extended time period (e.g. for four hours).

While run-in testing typically includes the same tests as functional testing, the functional tests are repeatedly performed during the defined run-in period. The test rack 52 used for run-in testing can also be configured to perform extended run-in tests. Since the same fixture 52 is preferably used for both functional testing and for extended run-in (burn-in) testing, there is no need for separate test fixtures, or for separate upkeep and training for separate test racks 52.

For run-in testing, self-test electronic assemblies 10 are placed into the test rack 52, as described above. The output signal ports (e.g. the audio and video (A/V) ports) are looped back automatically, by the test bay backplane connection 104, to the input signal ports. Connections to the test server 72, one or more display monitors 76, and power 78 are also made automatically by the test rack 52.

As with functional diagnostic self-testing, each of the self-test assemblies 10 can either start run-in testing as soon as they are installed into a test bay 56, or all self-test assemblies 10 can be started at one time, such as when all test bays 56 within a test rack 52 contain a self-test assembly 10.

The user interface 65 running on the command module 64 typically shows the status of tests at all times during run-in testing. In addition, upon completion of the tests, a display monitor 68, 76 attached to the system 50 displays either a "PASS" or a "FAIL" message. Failure information is stored within each self-test assembly 10, and is also preferably stored in a log file on the disk drive 63 of the control unit 64.

Detailed information regarding the tests are selectively displayed on the command unit 64, when a test operator clicks on a selected bay within the user interface 65. Each test is shown with a standard log file 24, and an associated error log. The test user interface 65 collects all the process information, and stores yield data and failure information, such that no manual operation is required from the operator, either for testing, or for SPC data collection.

Upon successful completion of either diagnostic and run-in tests, the self-test assemblies automatically exit the self-testing mode. The passing self-test assemblies are then typically moved, either manually by an operator, or automatically, in a robotic manufacturing and testing facility 53, 50 to a packing area 80. Outer covers and bezels are then typically installed on passing self-test assemblies 10, which are then prepared for shipment (e.g. visual inspection, bagging), and are then packed, typically with supplementary materials, such as connection cabling and manuals.

Repair and Troubleshooting. After testing, the retrievable data 24 within a "failed" self-test assembly 10 is preferably used in a troubleshooting and repair area 82. Each test creates a standard output, and a standard error file, within the test results 24. Based on the standard output and standard error file 24, the most likely source or sources of any problem can often be determined (e.g. a particular video path, or one or more chips). The retrievable data 24 is preferably used for failure analysis and repair, thus eliminating the need for manual tagging or data entry by an operator.

A repair area computer 83 is connected to the self-test assembly 10, and retrieves the stored test results and error file 24. The repair area computer 83 preferably includes failure analysis software, which analyzes the retrieved test report 24, and suggests potential problems, and preferably suggests solutions. For example, the repair computer 83 may suggest that the repair technician test one or more components 16 (e.g. such as suggesting that the technician measure voltage across pins on a microprocessor). The repair computer 83 also preferably shows graphically the desired (or problematic) sample pin signal waveforms. Upon the measurement or diagnosis of one or more components 16 or circuits 14, the software then preferably suggests further analysis or solutions.

In another preferred embodiment, a statistical display on the repair computer 83 accompanies potential reported problems. For example, for a given problem detected by a self-test assembly 10, either the self-test assembly 10, or the repair computer 83, preferably reports the statistical likelihood of the source of the reported problem (e.g. such as a reported "ninety percent chance of a problem at a first component 16a, as detected by a voltage between pin 1 and 8, and a ten percent chance of a problem at a second component 16b, as detected by a voltage between pin 1 and 16). The self-test assembly 10, test system 50, and repair computer 83, can therefore build "wisdom" to troubleshoot assemblies 10, based upon prior testing and solutions on one or more self-test assemblies 10, and also from input from technicians and engineers.

The stored test report 24 within each self-test assembly therefore provides a valuable tool that helps a technician troubleshoot and repair the self-test assembly 10. The stored and retrievable test report 24 therefore helps to diagnose and correct problems efficiently, and lowers the required skill level of repair technicians, thus lowering the average price for self-test assemblies 10.

Statistical Testing Overview. At the end of the test shift or work day, a summary file is prepared at the command computer 64, and is preferably printed, which shows the quantity of self-test electronic assemblies 10 tested, the serial number 29 of each tested assembly 10, the test results for each assembly 10, the overall yield (i.e. percent self-test electronic assemblies 10 passed for total of self-test electronic assemblies 10 tested), and a summary of the types of errors or rejected self-test assemblies 10 throughout the shift or day. The server 62 is also preferably interconnected to the manufacturing area 53, so that the results of testing status, units tested, and yield are optionally viewed, either in real time, or in storage for later retrieval, for review and reporting.

At any selected time during operation of the test system 50 (e.g. at 2:00 PM), the test system 50 preferably reports which assemblies 10 have been tested, and what the current yield of the facility 53, 50 (i.e. percent passing) for the time period. At the end of a day, the daily yield is accessible. At the end of the week, the weekly yield is accessible. While this type of report is desirable in manufacturing environments, the level of automation offered by the self-test assemblies 10 and self-test system 50 is unique. Furthermore, the level of diagnostic testing and troubleshooting information provided by each self-test assembly 10 is unique.

Internal Component Information Tracking. In extended manufacturing systems, similar electronic assemblies are commonly manufactured at different locations, such as at different factories within the same organization, or are manufactured by different suppliers, such as by contract manufacturing. Self-test electronic assembly units 10 typically include a distinct identification (e.g. a serial number) 29, which allows a test operator or user to determine the date of manufacture and manufacture site.

In some conventional electronic manufacturing systems, bar codes on components and chassis are sometimes used for identification. Bar code readers typically come into visual contact with the bar codes on the components and chassis along the assembly line. External means, such as supplementary computers, may be used to log the identifying bar codes, to track the components and their associated assemblies.

In contrast to such conventional tracking systems, the self-test electronic assembly 10 preferably tracks and logs the identity of it's components internally. Components 16 within a self-test assembly 10 commonly have unique system identification 17, which can often be determined by the processor 18. For example, each drive 20 has a unique serial number 17. Therefore, each self-test assembly unit 10 has a unique system identifier 29, and drive serial number 17.

Many of the other components 16 within a self-test assembly unit 10 include identifying information, which may be detected and stored. In addition to the serial number 17 of the disk drive 20, the stepping number 17 on the CPU 18 and on other components 16, such as on an encoder or decoder may also be identified.

Therefore, as each self-test assembly 10 is initialized (i.e. boots-up) and begins self-testing, the self-test assembly 10 preferably reads all available identification strings 17 from components 16 which include such information 17 (such as for an encoder), and logs the accessible identification strings 17, such as within memory 20. The self-test electronic assembly 10 preferably keeps track of all accessible information 17, and automatically links them to the serial number 29 of each self-test electronic assembly 10. The internal, stored status 24 of a self-test electronic assembly 10 therefore preferably includes functional test information, as well as all readable component information 17.

For a manufacturing area 53 that associates components 16 to identified self-test assemblies 10, the command station 64 preferably provides a display or warning, such as for a plurality identified failed self-test assemblies, which have an identified particular component 16 that is faulty. For example, if a new batch of encoders arrive at a manufacturing facility 53 (each having a trackable stepping number 17), for which a large percentage of self-test assemblies fail encoding and decoding loopback tests, the test system 51 preferably identifies the common problem, and preferably links the problem to the similar recorded stepping number 17 of the new batch of decoders.

Preferred Circuitry for Self-Test Assembly. FIG. 15 is a first circuit block diagram 170a for a preferred self-test electronic assembly. FIG. 16 is a second circuit block diagram 170b for the self-test assembly 10 shown in FIG. 15. While a basic self-test assembly 10 may be implemented for a wide variety of manufactured goods, the preferred self-test assembly embodiment 10 shown in FIG. 15 and FIG. 16 receives television program scheduling data, provides a time shifting system for television viewing, and also provides program guide data and control.

In one preferred embodiment of a preferred self-test electronic assembly 10, the microprocessor 18 is an IBM PPC403GCX processor. The serial port 172 of the processor 18 is linked to glue logic 174, security microprocessor 176, IR board 178, and IR output jack 180. The processor 18 is also linked to a reset 182, as well as to an address bus 184 and a data bus 186. A series of Address MUX's 188 are attached to the address bus 184, and are also linked to a series of EDO_DRAM 190, which are also connected to the data bus 186. Flash memory 192 is also linked to the address bus 184 and data bus 186. As well, a DSS port UART 194 is linked to the address bus 184 and data bus 186, and is connected to a DSS Port XVR 196 and a DSS I/O Jack 198. A modem MCU 200, which in one embodiment is a Rockwell Part No. RC336LU, is linked to the address bus 184 and data bus 186, and is connected to a modem MDP 202, which in one embodiment is a Rockwell Part No. RC336LDU. Flash memory 204 and SRAM memory 206 are also linked to the modem MCU 200 and to modem MDP 202. Also linked to the modem MDP 202 is DAA devices 208, 210, and 212, which in one embodiment are Krypton Part Nos. K951C, K934L, and K952 respectively. DAA 212 is also connected to RJ11 connector 214. A 12C bus 216 is connected to a clock chip 218, and to a battery 220.

As further shown in FIG. 16, the address bus 184, data bus 186, and 12C bus 216 are attached to media switch ASIC 222. The media switch ASIC 222 is attached to an IDE interface 224, an MPEG2 A/V decoder 226 (which in one embodiment is an IBM CS22), and an MPEG2 video encoder 228 (which in one embodiment is a Sony Part No. CXD1922Q). Test logic 22 is input through IDE interface 224. An MPEG2 audio encoder 230 is also linked to the media switch ASIC 222, and to the MPEG2 video encoder 228. The MPEG2 video encoder 228 uses SDRAM 232. A bus switch 234 is also linked to the address bus 184, the data bus 186, and to both the MPEG2 video encoder 228 and the MPEG2 audio encoder 230. An NTSC video encoder 236 (which in one embodiment is a Brooktree Part No. BT865A) is linked to the MPEG2 A/V decoder 226. The NTSC video encoder 236 is attached to a dual op-amp 238 (which in one embodiment is an Elantec Part No. EL2250C), which is attached to RCA stacks 240, 242. The NTSC video encoder 236 also includes S-video output connection 31. An audio mixer crystal 244 (which in one embodiment is an IBM Part No. CS4333) is attached to media switch ASIC 222, and to a quad op-amp 246 (which in one embodiment is a Motorola Part No. MS33204D), which includes RCA stack connectors 36, 38. A 3in1 tuner 248 (which in one embodiment is an Alps Part No. TMDH2xxxx series) is attached to the NTSC video encoder 236, to the quad op-amp 246, and is linked to an MTS audio decoder 250, and to an NTSC video decoder 252.

System Security. The preferred embodiment of the self-test assembly 10 shown in FIG. 15 and FIG. 16 is used as the platform for delivering a distributed television service. A key element for providing an economic and viable distributed television service is the provision for secure, authenticated communications between each receiver self-test assembly and a central database 264 (FIG. 19) of television viewing information. Therefore, preferred embodiments of the self-test electronic assembly 10 operate under a secure architecture. As well, secure, authenticated communications are preferred for other embodiments of the self-test assembly 10.

Figure 18:
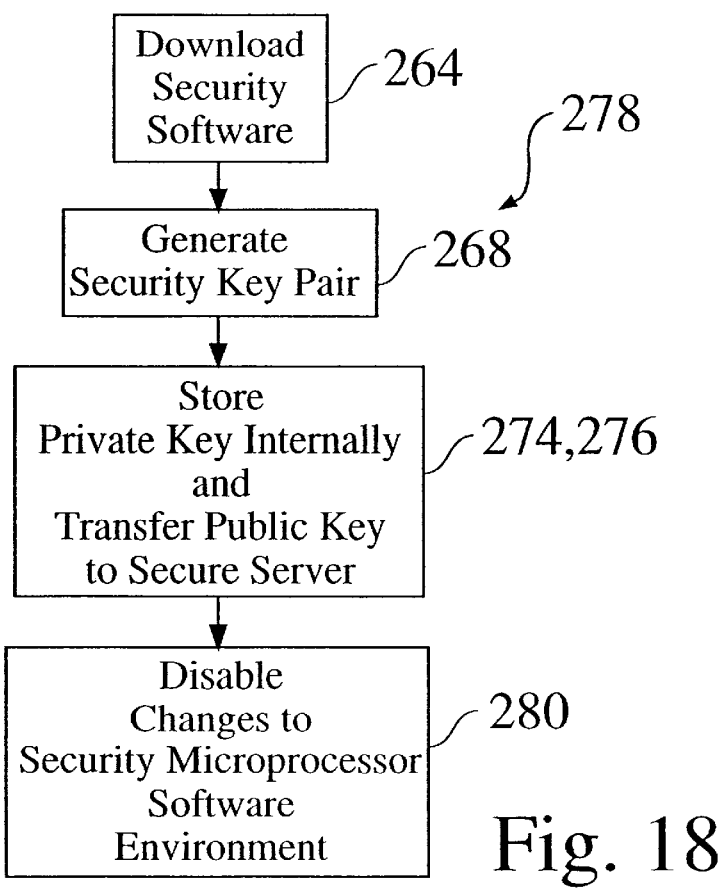
FIG. 18 is a flowchart showing the generation, storage and transfer of security keys within a security microprocessor.

FIG. 17 is a detailed block diagram of the transfer of a security software module 25 (FIG. 1) into the security microprocessor 176, and the subsequent generation, storage and transfer of security keys 270, 272 within the security microprocessor 176 during the manufacturing process. The security software module 25 includes an authentication algorithm 258, an encryption and decryption algorithm 260, and a key generation algorithm 262. FIG. 18 is a flowchart 278 showing the generation, storage and transfer of security keys 270, 272 within the security microprocessor 176.

When the self-test electronic assembly 10 is initially booted (or when self-testing is completed), the assembly generates it's own secret key 270, to restrict access into and out of the assembly 10. When the self-test electronic assembly 10 is located a test bay 56 of a test rack 52 and is being tested, the internal security microprocessor 176 downloads 264 the security software module 25 to internal memory 266. The security microprocessor 176 then runs the internally programmed security software 25 to generate a security key pair 268, comprising a public key 272 and a private key 270. The private key 270 is stored 274 within the internal memory 266 of the security microprocessor 176, and the public key 272 is sent 276, along with the test data, to the command unit 62, 64. As shown in FIG. 18, the security processor 176 then preferably disables changes to the security microprocessor software environment (e.g. such as by blowing a hardware fuse), thus preventing unauthorized use, access, or modification.

The private key 270 is used as an authentication and security mechanism to pass session keys to the self-test electronic assembly 10, as well as to authenticate external services. The private key 270 never appears on any of the buses (e.g. data bus 186) of the self-test assembly 10, nor is it ever transferred from the assembly 10. The external system uses the private key 270 to communicate with the self-test assembly 10 and control it, and to authenticate the system 50 to the self-test assembly 10, thereby accessing data and operational history about the self-test assembly 10. Therefore, the self-test assembly generates its own private key 270, and transfers the public key 276, which allows the system 50 to communicate with the self-test assembly 10.

Since each self-test assembly 10 generates its own secret private key 270 internally, and does not distribute the private key 270 externally, access to the self-test assembly 10 is strictly controlled. A qualified external system (e.g. the test system 51 or other qualified system) is only required to keep the public key 272 a secret, and each public key 272 is only valid for a particular self-test assembly 10. Therefore, the self-test assembly 10 establishes a secure, encrypted communication channel to qualified external systems.

Detailed Diagnostic Testing of Preferred Embodiment. Diagnostic testing of the preferred circuitry 14 shown in FIG. 15 and FIG. 16 consists of a series of core functional test units, designated as Core 0 functionality tests, Core 1 functionality tests, and Core 2 functionality tests.

Core 0 functionality test procedures 22 reside in flash memory, and in one embodiment consists of Flash/CRC tests, Power PC internal tests, System RAM memory tests, and Disk/IDE component tests.

Core 1 functionality test procedures 22 are typically stored in Kernel memory, and typically consist of a series of register tests on the level of the integrated circuits (IC's), which for the embodiment shown include the user level harness test, MediaSwitch register test, MPEG video encoder register test, MPEG audio encoder register test, a 12C register test (for the NTSC encoder, NTSC decoder stereo (MSP) encoder, RTC, and tuner), 12S register test, MPEG decoder register test, MPEG AV decoder SDRAM tests, and MPEG video encoder SDRAM tests.

Core 2 functionality test procedures 22 consist of full audio/visual (A/V), IR, and serial port loopback tests. The Core 2 functionality test procedures are located on Kernel memory, and typically consist of YUV colorbars and their encoded video representation on the storage drive, a series of decode, encode, decode loopback operations and comparison of video signals, audio standard signals and their encoded representation on the storage drive, a series of decode, encode, decode and comparison of the audio signals, VBI testing (which is performed on the RF, composite, and S-Video I/O's), IR loopback and programming, temperature sensing, time and date set operations, cooling fan testing, serial port testing, IR blaster connector testing, and modem command testing. The modem testing typically starts with UUT dialing an external modem (e.g. test modem 60), through a PSTN simulator 58, and sending a test file to the test PC 64 through a terminal server 62. Diagnostic tests are completed, even if there is an early failure, or if multiple failures are logged. The failure information is stored in a log file 24 on the self-test assembly drive 20.

Figure 19:
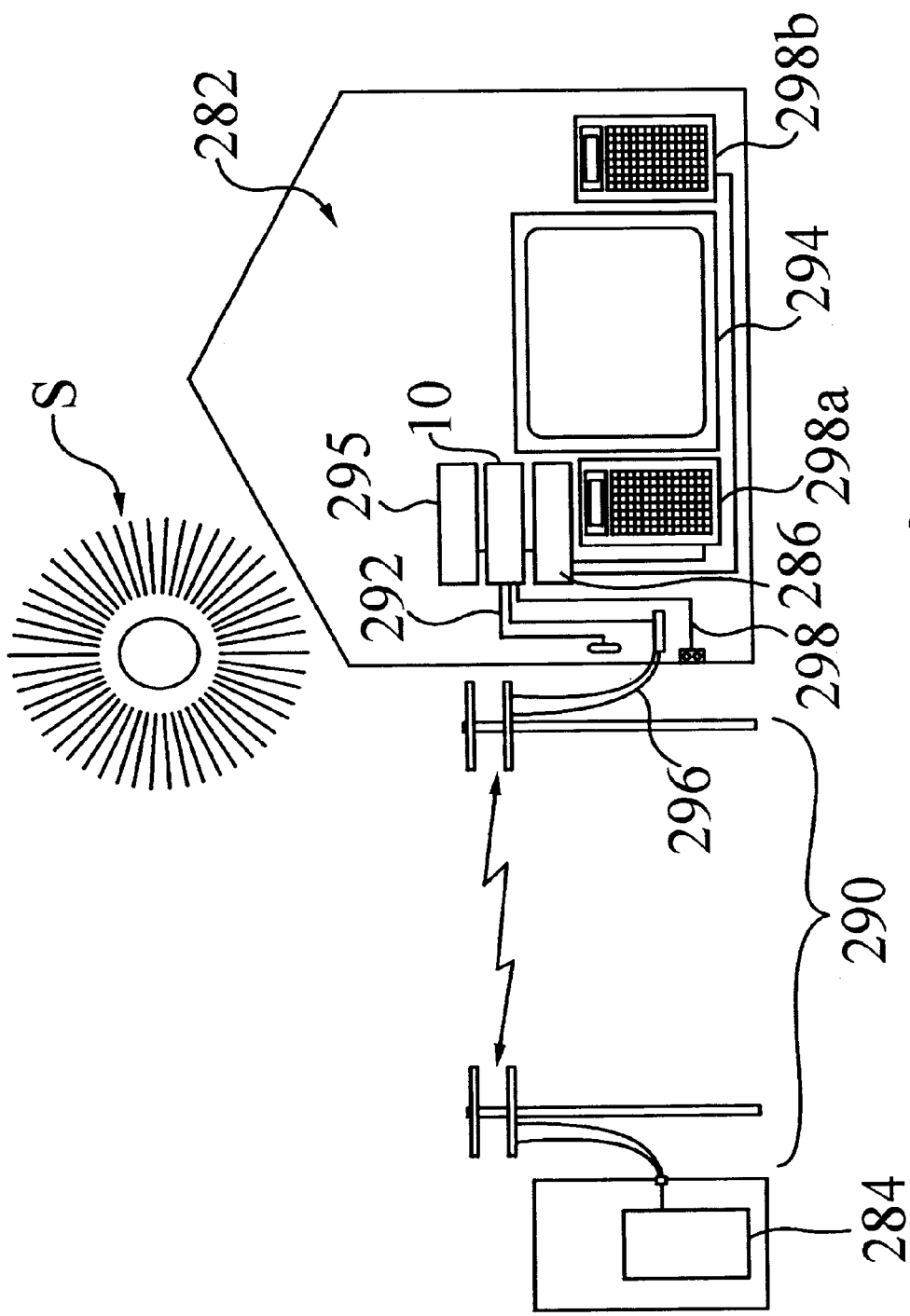
FIG. 19 is a system block diagram of an installed preferred self-test assembly in communication with a central computer.

Operation of an Installed Self-Test Assembly. The techniques described for the self-test assembly 10 may be implemented on a wide variety of manufactured goods. The preferred self-test assembly embodiment 10 shown in FIG. 15 and FIG. 16 receives television program scheduling data, provides a time shifting system for television viewing, and also provides program guide data and control. FIG. 19 is a system block diagram of an installed preferred self-test assembly 10 in communication with a central computer 284. Within a remote location 282, such as a home, a self-test assembly 10 is typically connected to power 298, an incoming television signal cable 292, a telephone line 290, and a television set 294, as well as to supplementary components, such as video cassette recorder 295, a stereo system 286, audio speakers 298a, 298b, and other devices, such as remote controllers, video game devices, or internet connection devices (e.g. such as a WebTV™ console and remote WebTV™ keyboard). The self-test assembly is also connected, such as through the telephone network 290, to a central system 284.

The preferred self-test assembly 10 selectively captures programming signals, and stores them (e.g. to an internal disk drive), for later retrieval and viewing). The program guide data helps the device controllably capture and store selected programs for the viewer, and preferably suggests available programming which matches an entered profile for the viewer. The preferred self-test assembly 10 optionally delivers suggestions on further viewing, based on the viewer's viewing habits (e.g. the self-test assembly 10 may detect if a viewer typically watches "do-it-yourself" type shows, and preferably suggests similar shows, or portions of upcoming shows, which offer related programming content, such as woodworking, gardening, or home maintenance programming).

The preferred self-test assembly 10 can also communicate information back to the central system 284, such as operating parameters (e.g. measured temperature), or retrieved test results of periodic self-testing (thus tracking the long-term performance of the assembly). The preferred self-test assembly 10 can optionally communicate television viewing histories back to a central system 284 as well, where the central system 284 typically aggregates viewing information from a plurality of viewers, thus producing statistical viewing data, as desired. The aggregation of viewing data provides valuable information, without using or disseminating the viewing data of individuals.

In-Situ Testing and Recording. In a preferred embodiment, when the assembled units 10 are distributed to and operated at external locations 282, each assembled unit 10 continues to monitor itself, and keeps track of external operation conditions, such as power failures, ambient or internal operating temperature. As discussed above, a temperature sensor 28 is preferably used to track ambient or operating temperature, whereby a fan 26 may be run, as necessary. In this embodiment, the self-test assembly continues to measure the temperature, and stores the information internally 24.

Periodically, from the field, the self-test assembly unit 10 communicates a central server 284, through the modem connection 44, and transfers such stored information. The central server 284 receives and stores monitoring information from one or more assembled units 10. The central server 284 or a connected computer 64 preferably cross-correlates the in-situ performance of each assembled unit 10 to the original test data and manufacture date for the assembled unit 10 and internal components 16a–16n, 20, 22, 26, 28. The system therefore provides a statistical mean-time to failure of the assemblies, and for any of the tracked components within the assembly.

In Situ Testing and Transfer of Data to Central System. The self test assembly 10 provides information on critical components, both during testing and after testing. Critical components are commonly defined as a small percentage of components within an assembly (e.g. 10 percent) which provide a high percentage of the manufacturing cost and reliable functionality for the assembly (e.g. 90 percent). In the preferred embodiment shown in FIG. 15 and FIG. 16, the MPEG encoder, decoders, microprocessor 18, and memory 20 can presently be considered to be critical components 16, due to their presently high cost, and their relative mean time between failure (as compared to other components 16 within the assembly 10).

The self-test assembly 10 preferably builds a database record based upon the components and test results for a period of time. The database record is periodically sent to the central system 264, and a central database is built, over time, both for each self-test assembly 10, and for related self-test assemblies 10 (e.g. such as similar components 16, circuitry 14, or manufacture date).

As well, a self-test assembly 10 preferably includes output to the user, depending on either the operating parameters or the test results. For example, a self-test assembly 10 that measures an extending operating temperature of 130 degrees Fahrenheit, the self-test assembly 10 can preferably output a message to the user to check the installed location (e.g. such as near a window in direct sunlight S, or near a heater).

Although the self-test electronic assembly 10 and its methods of use are described herein in connection with video and audio signal processing and storage, the apparatus and techniques can be implemented for other devices and other testing and operating environments. As well, while the self-test electronic assembly 10 and its methods of use are described herein in connection with specific hardware, such as microprocessors, encoders, decoders, and signal processing devices, the apparatus and techniques can be implemented with other analog or digital components and circuitry, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A process for creating a security key pair in a secure microprocessor system, comprising the steps of:
providing a memory device coupled to said microprocessor;
wherein said microprocessor generates a security key pair comprising a private key and a public key;
storing said private key in said memory device;
sending said public key to an external receiver; and
disabling changes to said memory device after said public key is transmitted.

2. The process of claim 1, wherein said public key is used to access said secure microprocessor system; and wherein said private key is not distributed outside of said secure microprocessor system.

3. The process of claim 1, further comprising the step of:
providing communication means on said secure microprocessor system for communicating information between said secure microprocessor system and said external receiver.

4. A process for creating a security key pair in a secure microprocessor system, comprising the steps of:
providing a memory device coupled to said microprocessor;
generating a security key pair comprising a private key and a public key;
providing storage means for storing said private key in said memory device;
storing said public key on a server; and
providing memory disabling means for disabling changes to said memory device after said private key is stored.

5. The process of claim 4, wherein said public key is used to access said secure microprocessor system; and wherein said private key is not distributed outside of said secure microprocessor system.

6. The process of claim 4, further comprising the step of:
providing communication means on said secure microprocessor system for communicating information between said secure microprocessor system and said server.

7. A process for creating a security key pair for a secure computer system, comprising the steps of:
providing a memory device on said computer system;
generating a security key pair comprising a private key and a public key;
storing said private key in said memory device;
sending said public key to a server; and
providing memory disabling means for disabling changes to said memory device after said private key is stored.

8. The process of claim 7, wherein said public key is used to access said secure computer system; and wherein said private key is not distributed outside of said secure computer system.

9. The process of claim 7, further comprising the step of:
providing communication means on said secure computer system for communicating information between said secure computer system and said server.

10. A process for creating a security key pair in a secure microprocessor system, comprising the steps of:
providing a memory device coupled to said microprocessor;
downloading security software into said memory device;
wherein said microprocessor executes said security software and generates a security key pair comprising a private key and a public key;

storing said private key in said memory device;
sending said public key to an external receiver; and
providing memory disabling means for disabling changes to said memory device after said public key is transmitted.

11. The process of claim 10, wherein said public key is used to access said secure microprocessor system; and wherein said private key is not distributed outside of said secure microprocessor system.

12. The process of claim 10, further comprising the step of: providing communication means on said secure microprocessor system for communicating information between said secure microprocessor system and said external receiver.

13. An apparatus for creating a security key pair in a secure microprocessor system, comprising:
a memory device coupled to said microprocessor;
wherein said microprocessor generates a security key pair comprising a private key and a public key;
a module for storing said private key in said memory device;
a module for sending said public key to an external receiver; and
a module for disabling changes to said memory device after said public key is transmitted.

14. The apparatus of claim 13, wherein said public key is used to access said secure microprocessor system; and wherein said private key is not distributed outside of said secure microprocessor system.

15. The apparatus of claim 13, further comprising:
communication means on said secure microprocessor system for communicating information between said secure microprocessor system and said external receiver.

16. An apparatus for creating a security key pair in a secure microprocessor system, comprising:
a memory device coupled to said microprocessor;
key generation means for generating a security key pair comprising a private key and a public key;
storage means for storing said private key in said memory device;
a module for storing said public key on a server; and
memory disabling means for disabling changes to said memory device after said private key is stored.

17. The apparatus of claim 16, wherein said public key is used to access said secure microprocessor system; and wherein said private key is not distributed outside of said secure microprocessor system.

18. The apparatus of claim 16, further comprising:
communication means on said secure microprocessor system for communicating information between said secure microprocessor system and said server.

19. An apparatus for creating a security key pair for a secure computer system, comprising:
a memory device on said computer system;
a module for generating a security key pair comprising a private key and a public key;
a module for storing said private key in said memory device;
a module for sending said public key on a server; and
memory disabling means for disabling changes to said memory device after said private key is stored.

20. The apparatus of claim 19, wherein said public key is used to access said secure computer system; and wherein said private key is not distributed outside of said secure computer system.

21. The apparatus of claim 19, further comprising:
communication means on said secure computer system for communicating information between said secure computer system and said server.

22. An apparatus for creating a security key pair in a secure microprocessor system, comprising:
a memory device coupled to said microprocessor;
a module for downloading security software into said memory device;
wherein said microprocessor executes said security software and generates a security key pair comprising a private key and a public key;
a module for storing said private key in said memory device;
a module for sending said public key to an external receiver; and
memory disabling means for disabling changes to said memory device after said public key is transmitted.

23. The apparatus of claim 22, wherein said public key is used to access said secure microprocessor system; and wherein said private key is not distributed outside of said secure microprocessor system.

24. The apparatus of claim 22, further comprising:
communication means on said secure microprocessor system for communicating information between said secure microprocessor system and said external receiver.

* * * * *